US011760657B2

(12) United States Patent
Dou et al.

(10) Patent No.: US 11,760,657 B2
(45) Date of Patent: Sep. 19, 2023

(54) POSITIVE ELECTRODE ACTIVE MATERIAL, METHOD FOR PREPARATION THEREOF, POSITIVE ELECTRODE PLATE, LITHIUM-ION SECONDARY BATTERY AND RELATED BATTERY MODULE, BATTERY PACK AND APPARATUS

(71) Applicant: Contemporary Amperex Technology Co., Limited, Ningde (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 18/109,866

(22) Filed: Feb. 15, 2023

(65) Prior Publication Data

US 2023/0202864 A1    Jun. 29, 2023

Related U.S. Application Data

(62) Division of application No. 17/683,389, filed on Mar. 1, 2022, now Pat. No. 11,613,474.

(30) Foreign Application Priority Data

Sep. 2, 2019 (CN) .......................... 201910824127.8

(51) Int. Cl.
*H01M 10/00* (2006.01)
*C01G 53/00* (2006.01)
*H01M 10/0525* (2010.01)

(52) U.S. Cl.
CPC ........ *C01G 53/44* (2013.01); *H01M 10/0525* (2013.01); *C01P 2002/52* (2013.01);
(Continued)

(58) Field of Classification Search
CPC ............. C01P 2006/12; C01P 2006/40; C01P 2002/88; H01M 4/525; H01M 10/525
See application file for complete search history.

(56) References Cited

U.S. PATENT DOCUMENTS

2016/0181611 A1* 6/2016 Cho ...................... C01G 53/50
429/223

FOREIGN PATENT DOCUMENTS

CN    107394193 A    11/2017
CN    108269981 A    7/2018
(Continued)

OTHER PUBLICATIONS

The First Office Action for Chinese Application No. 201910824127.8, dated Jul. 21, 2021, 6 pages.
(Continued)

*Primary Examiner* — Cynthia H Kelly
*Assistant Examiner* — Monique M Wills
(74) *Attorney, Agent, or Firm* — East IP P.C.

(57) ABSTRACT

The present application discloses a positive electrode active material including a lithium nickel cobalt manganese oxide, the molar content of nickel in the lithium nickel cobalt manganese oxide accounts for 60%-90% of the total molar content of nickel, cobalt and manganese, and the lithium nickel cobalt manganese oxide has a layered crystal structure of a space group R $\overline{3}$m; a transition metal layer of the lithium nickel cobalt manganese oxide includes a doping element, and the local mass concentration of the doping element in particles of the positive electrode active material has a relative deviation of 20% or less; and in a differential
(Continued)

scanning calorimetry spectrum of the positive electrode active material in a 78% delithiation state, an initial exothermic temperature of a main exothermic peak is 200° C. or more, and an integral area of the main exothermic peak is 100 J/g or less.

5 Claims, 4 Drawing Sheets

(52) U.S. Cl.
CPC ....... *C01P 2006/10* (2013.01); *C01P 2006/11* (2013.01); *C01P 2006/12* (2013.01); *C01P 2006/40* (2013.01)

(56) References Cited

FOREIGN PATENT DOCUMENTS

| | | | |
|---|---|---|---|
| CN | 109004175 | A | 12/2018 |
| CN | 109437339 | A | 3/2019 |
| CN | 109665570 | A | 4/2019 |
| CN | 109713252 | A | 5/2019 |
| CN | 109904432 | A | 6/2019 |
| CN | 110034297 | A | 7/2019 |
| WO | 2011108652 | A1 | 9/2011 |
| WO | 2019074306 | A2 | 4/2019 |

OTHER PUBLICATIONS

The extended European search report for European Application No. 20861329.9, dated May 31, 2022, 7 pages.
The Second Office Action for Chinese Application No. 201910824127.8, dated Oct. 27, 2021, 4 pages.
The First Office Action for India Application No. 202127057110, dated May 6, 2022, 6 pages.
The International search report for PCT Application No. PCT/CN2020/109996, dated Nov. 24, 2020, 7 pages.
The First Office Action for JP Application No. 2022-513042, dated Sep. 13, 2022, 6 pages.
The Non-final Office Action for U.S. Appl. No. 17/683,389, dated Sep. 13, 2022, 13 pages.
Ping Cui et al: "Preparation and characteristics of Sb-doped LiNiOcathode materials for Li-ion batteries", Apr. 22, 2011, 5 pages.
Li Zhifeng et al: "Effects of Nb substitution on structure and electrochemical properties of LiNiO. 7MnO. 3O2cathode materials", May 23, 2018, 10 pages.
Aziam H. et al: "Understanding the electro chemical lithiation/delithiation process in the anode material for lithiumion batteries NiFeOPO4/C using ex-situ X-ray absorption near edge spectroscopy and in-situ synchrotron X-ray", Sep. 1, 2018, 7 pages.
Lei Yike et al: "Nb-doping in LiNi0.8Co0.IMn0.1O2 cathode material:Effect on the cycling stability and voltage decay at high rates", Feb. 8, 2019, 9 pages.

\* cited by examiner

POSITIVE ELECTRODE ACTIVE MATERIAL, METHOD FOR PREPARATION THEREOF, POSITIVE ELECTRODE PLATE, LITHIUM-ION SECONDARY BATTERY AND RELATED BATTERY MODULE, BATTERY PACK AND APPARATUS

CROSS-REFERENCES TO RELATED APPLICATIONS

This application is a divisional application of U.S. patent application Ser. No. 17/683,389, filed on Mar. 1, 2022, which is a continuation of International Application No. PCT/CN2020/109996, filed on Aug. 19, 2020. The International Application claims priority to Chinese Patent Application No. 201910824127.8, filed on Sep. 2, 2019. The aforementioned patent applications are hereby incorporated by reference in their entireties.

TECHNICAL FIELD

This application belongs to the technical field of secondary batteries, and particularly relates to a positive electrode active material, a method for the preparation thereof, a positive electrode plate, a lithium-ion secondary battery and as well a battery module, a battery pack and an apparatus.

BACKGROUND

Lithium-ion secondary battery is a kind of rechargeable battery, which mainly relies on the movement of lithium ions between the positive electrode and the negative electrode to work, and is currently a widely used clean energy. As an important part of a lithium-ion secondary battery, a positive electrode active material provides lithium ions that move back and forth between the positive electrode and the negative electrode for the charging and discharging processes of a battery. Therefore, the positive electrode active material is very important to the performance of the battery.

Lithium nickel cobalt manganese oxide has a relatively high theoretical capacity, and a lithium-ion secondary battery using lithium nickel cobalt manganese oxide as positive electrode active materials may be expected to obtain relatively high energy density. However, how to make the lithium-ion secondary battery have both higher energy density and good high-temperature cycle performance has become a technical problem to be solved urgently.

SUMMARY

A first aspect of the present application provides a positive electrode active material, including a lithium nickel cobalt manganese oxide, wherein the molar content of nickel in the lithium nickel cobalt manganese oxide is 60%-90% of the total molar content of nickel, cobalt and manganese, and the lithium nickel cobalt manganese oxide has a layered crystal structure with space group R $\bar{3}$m; a transition metal layer of the lithium nickel cobalt manganese oxide including a doping element, and the local mass concentration of the doping element in particles of the positive electrode active material has a relative deviation of 20% or less; and in a differential scanning calorimetry spectrum of the positive electrode active material in a 78% delithiated state, an initial exothermic temperature of a main exothermic peak is 200° C. or more, and an integral area of the main exothermic peak is 100 J/g or less.

The positive electrode active material provided by this application includes lithium nickel cobalt manganese oxide with high nickel content, which has relatively high charge/discharge voltage and specific capacity characteristics. The use of the positive electrode active material can enable lithium-ion secondary batteries to have higher capacity performance and energy density. At the same time, the lithium nickel cobalt manganese oxide also includes doping elements, and the relative deviation of the local mass concentration of the doping elements in the particles of the positive electrode active material is 20% or less; and in a differential scanning calorimetry spectrum of the positive electrode active material in the 78% delithiated state, an initial exothermic temperature of a main exothermic peak is 200° C. or above, and an integral area of the main exothermic peak is 100 J/g or less; these parameters can make the positive electrode active material have higher thermal stability and high-temperature cycle stability. Therefore, the use of the positive electrode active material of the present application can also enable the lithium-ion secondary battery to have higher high-temperature cycle performance.

In any one of the above embodiments, a full width at half maxima of the main exothermic peak may be 30° C. or less. The positive electrode active material satisfying the above conditions can obtain higher thermal stability and high-temperature cycle stability, thereby further improving the high-temperature cycle performance of the lithium-ion secondary battery.

In any one of the above embodiments, a peak temperature of the main exothermic peak may be 230° C. or higher. Satisfying the above conditions, the thermal stability of the positive electrode active material can be further improved, thereby improving the high-temperature cycle performance of the battery.

In any one of the foregoing embodiments, the relative deviation of the local mass concentration of the doping element in the particles of the positive electrode active material is 15% or less. The battery using such positive electrode active material can obtain higher energy density and high-temperature cycle performance.

In any one of the above embodiments, when the positive electrode active material is in the 78% delithiated state, the doping element may have a valence of +3 or more, and optionally have a valence of one or more of +4, +5, +6, +7, and +8. Doping elements with a high valence can effectively bind oxygen atoms, and can also increase the initial exothermic temperature and maximum exothermic temperature of the main exothermic peak in the DSC plot of the positive electrode active material after delithiation, and reduce integrated area and full width at half maxima of the main exothermic peak. Thus, the positive electrode active material has higher thermal stability and high-temperature cycle stability, thereby further improving the energy density and high-temperature cycle performance of the battery.

In any embodiment as described above, the doping element may include one or more of Al, Si, Ti, V, Ge, Se, Zr, Nb, Ru, Pd, Sb, Te, and W. Optionally, the doping element may include one or more of Al, Si, Ge, Se, Zr, Nb, Ru, Sb, Te, and W. Optionally, the doping element M may include one or more of Si, Ge, Se, Ru, Sb, Te, and W. These doping elements can better improve the above-mentioned effects, and further improve the energy density and high-temperature cycle performance of the lithium-ion secondary battery.

In any embodiment as described above, the positive electrode active material may have true density $\rho_{true}$ satisfying 4.6 g/cm³ ≤ $\rho_{true}$ ≤ 4.9 g/cm³. Such positive electrode active material can have a relatively high specific capacity, which can increase the energy density of the battery.

In any embodiment as described above, the positive electrode active material may have a true doping concentration ω satisfying 2300 μg/cm³≤ω≤49500 μg/cm³, optionally 3000 μg/cm³≤ω≤35000 μg/cm³, optionally 14810 μg/cm³≤ω≤36710 μg/cm³. By using the positive electrode active material having true doping concentration within the suitable ranges, the initial exothermic temperature and maximum exothermic temperature of the main exothermic peak in the DSC plot of the positive electrode active material in the "78% delithiated state" can be further improved, and the integrated area and full width at half maxima of the main exothermic peak can be reduced. At the same time, it also ensures that the positive electrode active material has good lithium ion transport performance, which can improve the energy density and high-temperature cycle performance of the battery.

In any embodiment as described above, the deviation ε of the mass concentration of the doping element in the positive electrode active material relative to the average mass concentration of the doping element in the particles of the positive electrode active material satisfies ε<50%; optionally, ε≤30%; and optionally, ε≤20%. By using the positive electrode active material having ε within the above ranges, the positive electrode active material may have relatively good macroscopic and microscopic consistency. During the charging and discharging cycle of the positive electrode active material, the expansion and contraction of the particles remain consistent, and the stability of the particles is high, which is conducive to higher capacity development and cycle performance at room temperature and high temperature. Therefore, the corresponding performance of the battery is also improved.

In any embodiment as described above, the positive electrode active material may have a volume average particle diameter W0 of from 5 μm to 20 optionally from 8 μm to 15 and further optionally from 9 μm to 11 By using the positive electrode active material having W0 within the above ranges, the transmission and diffusion performance of lithium ions and electrons can be further improved, thereby improving the cycle performance and rate performance of the lithium-ion secondary battery. The positive electrode active material can also have a higher compacted density, which can improve the energy density of the battery.

In any embodiment as described above, the positive electrode active material may have a specific surface area of from 0.2 m²/g to 1.5 m²/g, optionally from 0.3 m²/g to 1 m²/g. By using the positive electrode active material having specific surface area within the above ranges, the capacity and cycle life of the positive electrode active material can be improved, and the processing performance of the positive electrode slurry can also be improved, so that the battery can obtain higher energy density and cycle performance.

In any embodiments as described above, the positive electrode active material may have a tap density of from 2.3 g/cm³ to 2.8 g/cm³. The tap density of the positive electrode active material is within the above-mentioned range, which is beneficial to making the lithium-ion secondary battery have a higher energy density.

In any embodiment as described above, the positive electrode active material may have a compacted density under a pressure of 5 tons (equivalent to 49 kN) of from 3.1 g/cm³ to 3.8 g/cm³. By using the positive electrode active material having a compacted density within the above range, relatively high energy density and cycling performance of the battery can be obtained.

In any embodiment as described above, the lithium nickel cobalt manganese oxide may satisfy a chemical formula $Li_{1+a}[Ni_xCo_yMn_zM_b]O_2$, in which M is the doping element, and M is selected from one or more of Al, Si, Ti, V, Ge, Se, Zr, Nb, Ru, Pd, Sb, Te, and W, 0.7≤x≤0.9, 0<y<0.3, 0<z<0.3, 0≤a<0.2, 0<b<0.3, and x+y+z+b=1.

In any embodiment as described above, the lithium nickel cobalt manganese oxide may satisfy a chemical formula $Li_{1+c}[Ni_{r-d}Co_sM_{tt}M'_d]O_2$, in which M' is the doping element, and M' is selected from one or more of Al, Si, Ti, V, Ge, Se, Zr, Nb, Ru, Pd, Sb, Te, and W, 0.7≤r-d≤0.9, 0<s<0.3, 0<t<0.3, 0≤c<0.2, 0<d<0.3, and r+s+t=1.

A second aspect of the present application provides a method for preparing a positive electrode active material, including the following steps:

mixing a positive electrode active material precursor, a lithium source and a doping element precursor to obtain a mixed material, wherein the positive electrode active material precursor is selected from one or more of oxides, hydroxides, and carbonates containing Ni, Co and Mn, and the molar content of nickel accounts is 60% to 90% of the total molar content of nickel, cobalt and manganese;

subjecting the mixed material to sintering treatment, to obtain the positive electrode active material;

wherein the positive electrode active material comprises a lithium nickel cobalt manganese oxide, and the lithium nickel cobalt manganese oxide has a layered crystal structure of a space group R $\bar{3}$ m;

a transition metal layer of the lithium nickel cobalt manganese oxide comprises a doping element, and the local mass concentration of the doping element in particles of the positive electrode active material has a relative deviation of 20% or less; and in a differential scanning calorimetry spectrum of the positive electrode active material in a 78% delithiated state, an initial exothermic temperature of a main exothermic peak is 200° C. or more, and an integral area of the main exothermic peak is 100 J/g or less.

The positive electrode active material provided by this application includes lithium nickel cobalt manganese oxide with high nickel content, while the lithium nickel cobalt manganese oxide also includes doping elements, and the local mass concentration of the doping element in particles of the positive electrode active material has a relative deviation of 20% or less, and in a differential scanning calorimetry spectrum of the positive electrode active material in a 78% delithiated state, an initial exothermic temperature of a main exothermic peak is 200° C. or more, and an integral area of the main exothermic peak is 100 J/g or less. Thereby the lithium ion secondary battery using the positive electrode active material has higher energy density and high-temperature cycle performance.

In any of the above embodiments, the doping element precursor may be selected from one or more of aluminum oxide, silicon oxide, titanium oxide, vanadium oxide, germanium oxide, selenium oxide, zirconium oxide, niobium oxide, ruthenium oxide, palladium oxide, antimony oxide, tellurium oxide, and tungsten oxide. Optionally, the doping element precursor may be selected from one or more of $Al_2O_3$, $SiO_2$, $SiO$, $TiO_2$, $TiO$, $V_2O_5$, $V_2O_4$, $V_2O_3$, $GeO_2$, $SeO_2$, $ZrO_2$, $Nb_2O_5$, $NbO_2$, $RuO_2$, $PdO$, $Sb_2O_5$, $Sb_2O_3$, $TeO_2$, $WO_2$, and $WO_3$.

In any of the foregoing embodiments, the atmosphere of the sintering process is an oxygen-containing atmosphere;

optionally, the oxygen concentration of the sintering atmosphere is from 70% to 100%, and optionally from 75% to 95%.

In any of the foregoing embodiments, the temperature for sintering is from 600° C. to 1000° C., optionally from 700° C. to 900° C.

In any of the foregoing embodiments, the time for sintering is from 5 h to 25 h, optionally from 10 h to 20 h.

In any of the above embodiments, the doping element precursor may be equally or randomly divided into L parts for L batches of doping, wherein L is from 1 to 5, optionally from 2 to 3. Optionally, the embodiments including: the positive electrode active material precursor, lithium source and first batch of doping element precursor is mixed, followed by first sintering process; the product obtained from the first sintering process is mixed with the second batch of doping element precursor, followed by second sintering process; and so on, until the product obtained from L−1 sintering process is mixed with the L batch of doping element precursor, followed by L-th sintering treatment, to obtain a positive electrode active material.

In any of the foregoing embodiments, the temperature for each of sintering processes may be from 600° C. to 1000° C., optionally from 700° C. to 900° C., and further optionally is from 800° C. to 850° C.

In any of the foregoing embodiments, the time of each of sintering processes may be from 3 h to 25 h, optionally from 5 h to 10 h.

In any of the foregoing embodiments, the total time for sintering may be from 5 h to 25 h, optionally from 15 h to 25 h.

A third aspect of the present application provides a positive electrode plate, including a positive electrode current collector and a positive electrode active material layer disposed on the positive electrode current collector, wherein the positive electrode active material layer includes the positive electrode active material of the first aspect of the present application, or the positive electrode active material obtained according to the method of the second aspect of the present application.

Since the positive electrode plate of the present application contains the positive electrode active material described herein, the lithium-ion secondary battery containing the positive electrode plate can have relatively high energy density and high-temperature cycling performance.

A fourth aspect of the present application provides a lithium-ion secondary battery, including the positive electrode plate according to the third aspect of the present application.

Since the lithium-ion secondary battery of the present application includes the positive electrode plate, it can have relatively high energy density and high-temperature cycling performance.

A fifth aspect of the present application provides a battery module, including the lithium-ion secondary battery of the fourth aspect of the present application.

A sixth aspect of the present application provides a battery pack, including the lithium-ion secondary battery of the fourth aspect of the present application or the battery module of the fifth aspect of the present application.

A seventh aspect of the present application provides an apparatus, including at least one of the lithium-ion secondary battery of the fourth aspect of the present application, the battery module of the fifth aspect of the present application, or the battery pack of the sixth aspect of the present application.

The battery module, battery pack, and apparatus of the present application include the lithium-ion secondary battery of the present application, and thus have at least the same or similar effects as the lithium-ion secondary battery.

BRIEF DESCRIPTION OF DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the drawings without creative work.

DETAILED DESCRIPTION

Figure 1:
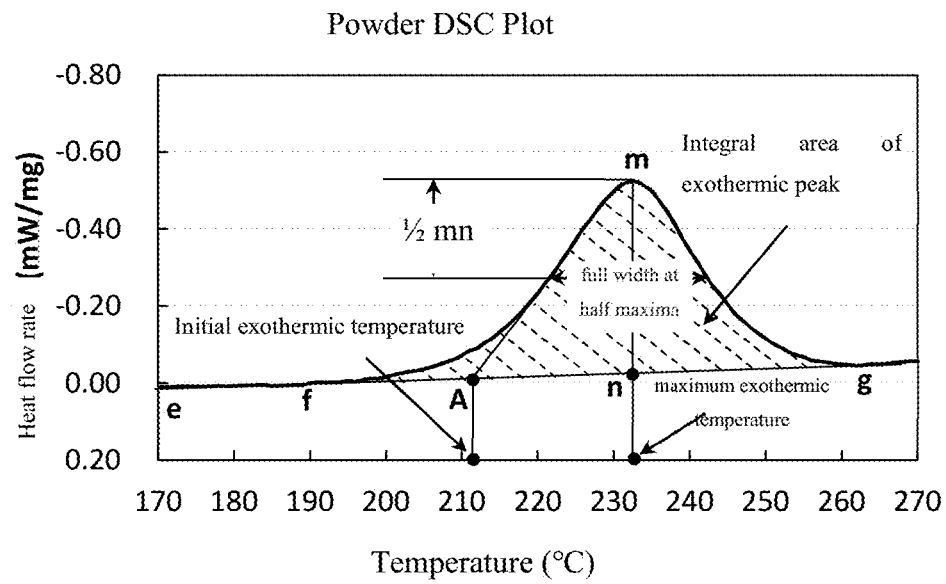
FIG. 1 is a plot of the exothermic curve measured by differential scanning calorimeter (DSC) of a positive electrode active material according to an embodiment of this application, i.e., the spectrogram of differential scanning calorimetry, referred to as the DSC plot.
Figure 2:
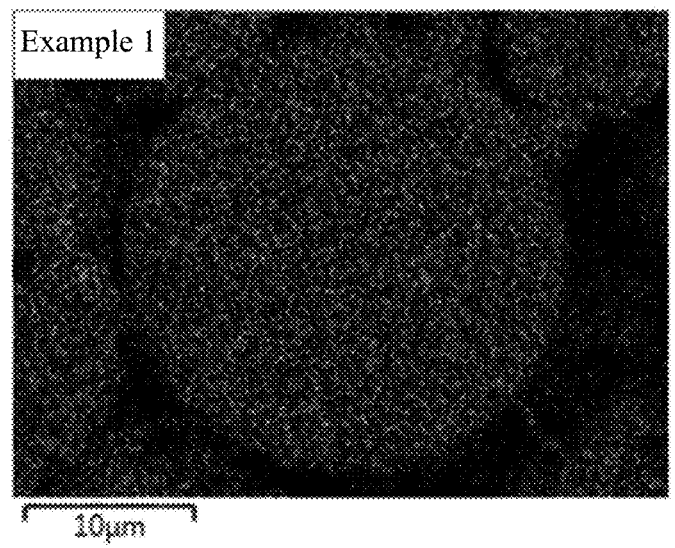
FIG. 2 is a cross-sectional image of the positive electrode active material particles of Example 1, in which bright spots in the image indicate the doping elements, and the doping elements are evenly distributed in the particles.

In order to make the object, technical solution, and technical effects of the present application clearer, the following further describes the present application in details with reference to the embodiments. It should be understood that the embodiments described in the present description are merely used to illustrate the present application, but not intended to limit the present application.

For the sake of brevity, only certain numerical ranges are explicitly disclosed herein. However, any lower limit may be combined with any upper limit to form a range that is not explicitly described; and any lower limit may be combined with other lower limit to form an unspecified range; and any upper limit may be combined with any other upper limit to form an unspecified range. Further, although not explicitly specified, each point or single value between the endpoints of a range is included in the range. Thus, each point or single value can be combined with any other point or single value or combined with other lower or upper limits to form a range that is not explicitly specified.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

In the description herein, unless otherwise stated, the term "or" is inclusive. For example, the phrase "A or B" means "A, B, or both A and B." More specifically, any of the following conditions satisfy the condition "A or B": A is true (or exists) and B is false (or does not exist); A is false (or does not exist) and B is true (or exists); or both A and B are true (or exist).

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Active Material

The positive electrode active material of the first aspect of the present application comprises a lithium nickel cobalt manganese oxide, wherein a molar content of nickel in the lithium nickel cobalt manganese oxide is 60%-90% of the total molar content of nickel, cobalt and manganese, and the lithium nickel cobalt manganese oxide has a layered crystal structure with space group R$\bar{3}$m; a transition metal layer of the lithium nickel cobalt manganese oxide comprises a doping element, and the local mass concentration of the doping element in particles of the positive electrode active material has a relative deviation of 20% or less; and in a differential scanning calorimetry plot of the positive electrode active material in a 78% delithiated state, an initial exothermic temperature of a main exothermic peak is 200° C. or more, and an integral area of the main exothermic peak is 100 J/g or less.

In this application, the local mass concentration of doping element in in particles of the positive electrode active material is mass concentration of doping element in all elements within the finite volume element at any selected location in the particles, which can be obtained by EDX (Energy Dispersive X-Ray Spectroscopy) or EDS element analysis combined with TEM (Transmission Electron Microscope) or SEM (Scanning Electron Microscope) single-point scanning test of element concentration distribution or other similar methods. When EDX or EDS element analysis is combined with TEM or SEM single-point scanning test, the mass concentration of doping element at different locations in particles of in particles of the positive electrode active material expressed in μg/g is respectively denoted as $\eta_1, \eta_2, \eta_3, \ldots, \eta_n$, wherein n is a positive integer greater than 15.

Average mass concentration of doping elements in particles of the positive electrode active material is mass concentration of doping elements in all elements within single or multiple particles of the positive electrode active material, which can be obtained by EDX or EDS element analysis combined with TEM or SEM surface scanning test of element concentration distribution or other similar methods. When the EDX or EDS element analysis is combined with the TEM or SEM surface scanning test of element concentration distribution, the tested surface includes all the points in the above single-point test. Average mass concentration of doping elements in particles of the positive electrode active material is recorded as $\bar{\eta}$, in μg/g.

The relative deviation σ of local mass concentration of doping elements in particles of the positive electrode active material can be calculated according to Formula (1):

$$\sigma = \frac{\max\{|\eta_1 - \bar{\eta}|, |\eta_2 - \bar{\eta}|, |\eta_3 - \bar{\eta}|, \ldots, |\eta_n - \bar{\eta}|\}}{\bar{\eta}} \quad \text{Formula (1)}$$

As used herein, "78% delithiated state" refers to the state in which a molar content of lithium deintercalated from the positive electrode active material is 78% of the theoretical lithium content during charging process of the battery. In the actual use of a secondary battery, a "fully charged state" is generally set, and a corresponding "charge cut-off voltage" is set to ensure the safe use of a battery. "Fully charged state" means that the state of charge (SOC) of secondary battery is 100%. In other words, the secondary battery comprising the positive electrode comprising the above-mentioned positive electrode active material is charged to the charge cut-off voltage within the range of reversible charging and discharging. The "fully charged state" or "charge cut-off voltage" may have certain differences due to different positive electrode active material or different safety requirements. When the secondary battery made of positive electrode active material comprising lithium nickel cobalt manganese oxide is in the "fully charged state", the delithiated state of the positive electrode active material is generally around "78% delithiated state" to ensure normal use.

In the present application, the positive electrode active material in the "78% delithiated state" is studied, in combination with corresponding relationship between the "delithiated state" and the charging voltage. Specifically, a series of batteries using the positive electrode active material will be charged at a rate of 0.1 C to 2.8V, 2.9V, 3.0V, 3.1V, 3.2V, 3.3V, . . . 4.0V, 4.1V, 4.2V, 4.3V, 4.4V, and 4.5V (that is, the charging voltage interval is 0.1V), respectively; then the positive electrode plate of the battery is taken out and washed for removing electrolyte; the positive electrode active material is digested; and by using the inductively coupled plasma-Optical Emission spectrometers (ICP-OES), mass concentration of Li, transition metals (Ni, Co, Mn), and O elements of the positive electrode active material are tested; the stoichiometric ratios of elements of the positive electrode active material at the charging voltage are calculated; and after conversion, the chemical formula of the positive electrode active material at the charging voltage is obtained; and thus the charging voltage corresponding to the "78% de-lithium state" is obtained.

The battery containing the positive electrode active material to be tested is charged to the voltage corresponding to the "78% delithiated state", and then disassembled to obtain the positive electrode active material in the "78% delithiated state" for further study.

The DSC plot of the positive electrode active material in the "78% delithiated state" is measured by a differential scanning calorimeter. FIG. 1 shows a DSC plot of a positive electrode active material as an example. As shown in FIG. 1, the DSC plot is a graph drawn with heat flow rate as the ordinate and temperature as the abscissa. In this application, the main exothermic peak is the peak with the largest integrated area in the DSC plot, which is the exothermic peak produced by the irreversible phase transition of the layered phase structure of the positive electrode active material due to the release of oxygen. The onset exothermic temperature of the main exothermic peak is the intersection A of the tangent to the maximum slope point on the low temperature side of the main exothermic peak and the extension of the baseline of before the peak (i.e., the extrapolation starting point). The integral area of the main exothermic peak is the area of the region enclosed by the exothermic peak and the inscribed baseline fg, which is used to characterize the heat emitted by the positive electrode active material per unit weight in this interval.

The positive electrode active material according to the embodiment of this application comprises lithium nickel cobalt manganese oxide, and the molar content of nickel is 60% to 90% of the total molar content of nickel, cobalt and manganese. The lithium nickel cobalt manganese oxide with high nickel content has higher charge and discharge voltage and specific capacity characteristics, so that the lithium-ion secondary battery using it can exhibit higher capacity performance and energy density.

The lithium nickel cobalt manganese oxide according to the embodiment of this application further comprises a doping element, and the relative deviation σ of the local mass concentration of the doping element in the particles of the positive electrode active material is 20% or less. The distribution of doping elements in the positive electrode active material particles is uniform, and the properties inside the particles remain consistent. The doping elements can improve the structural stability of each position of the particles, and inhibit the oxygen release and structural phase transitions at each position of the particles. It is beneficial to increasing the initial exothermic temperature of the main exothermic peak in the DSC plot of the positive electrode active material in the "78% delithiated state", and reduce the integral area of the main exothermic peak.

In the DSC plot of the positive electrode active material in the "78% delithiated state", the onset exothermic temperature of the main exothermic peak is 200° C. or higher, and can further be 205° C. or higher, 207° C. or higher, or 210° C. or higher. The initial exothermic temperature of the main exothermic peak is relatively high, so that the positive electrode active material has high structural stability during high-temperature cycle and heating conditions, and always maintains a strong electrochemically active layered phase state, in which the oxygen atoms are not easy to leave the original lattice position. The positive electrode active material is not prone to irreversible structural phase transition, so that it can exhibit higher thermal stability and high-temperature cycle stability, thereby improving the high-temperature cycle performance and safety performance of the lithium-ion secondary battery.

In the DSC plot of the positive electrode active material in the "78% delithiated state", the integrated area of the main exothermic peak is 100 J/g or less, and can be 85 J/g or less, 74 J/g or less, 67 J/g or less, 55 J/g or less, or 48 J/g or less. The integral area of the main exothermic peak is small, that is, the amount of heat released by the positive electrode active material during high temperature cycling and heating conditions is reduced, indicating that an irreversible reaction or structural failure that the positive electrode active material undergoes during high temperature cycling and heating conditions is reduced. The thermal stability and high-temperature cycle stability of the positive electrode active material are effectively improved, which can significantly improve the high-temperature cycle performance and safety performance of the lithium-ion secondary battery.

In addition, in the uniformly doped positive electrode active material, the migration and diffusion capacity of lithium ions in different areas inside the particles is at the same level, which enables the positive electrode active material to have higher lithium-ion transport performance, which is beneficial to improving the capacity performance, energy density and cycle performance of the battery. In the uniformly doped positive electrode active material, the structural stability and anti-deformation ability of the particles are close to each other, so that the stress distribution in the particles is uniform. The particles of the positive electrode active material are not prone to cracking, preventing side reactions and deterioration of capacity and cycle performance caused by the fresh surface exposed by the cracking, thereby further improving the high-temperature cycle performance of the battery.

The use of the positive electrode active material according to the embodiment of the present application enables the lithium-ion secondary battery to simultaneously have higher capacity performance, energy density, and high-temperature cycle performance.

The lithium nickel cobalt manganese oxide comprise doping elements, and the relative deviation σ of the local mass concentration of the doping elements in the particles of the positive electrode active material is 20% or less, which can also improve the maximum exothermic temperature of the main exothermic peak in the DSC plot of the positive electrode active material in the "78% delithiated state" and reduce the full width at half maxima of the main exothermic peak.

In some embodiments, in the DSC plot of the positive electrode active material in the "78% delithiated state", the full width at half maxima of the main exothermic peak is optionally 30° C. or less, and further optionally 28° C. or less. In this application, the full width at half maxima of the main exothermic peak is the peak width at half of the peak height mn, in which n is the intersection of a straight line perpendicular to the abscissa as the peak top m of the main exothermic peak and the inscribed baseline fg.

The full width at half maxima of the main exothermic peak is within the range as described above. That is to say, the irreversible reaction or structural damage of the positive electrode active material in the "78% delithiated state" during high-temperature cycle and heating conditions is further reduced, and the thermal stability and high-temperature cycle stability of the positive electrode active material are further improved, thereby further improving the performance of the lithium-ion secondary battery.

The full width at half maxima of the main exothermic peak is within the above range, which also means that the doping modification of the positive electrode active material does not produce obvious new phases. The doping element is basically doping and substitution at one or more of nickel sites, manganese sites, and cobalt sites, and the positive electrode active material maintains a good layered crystal structure. The positive electrode active material can provide a good carrier for the deintercalation of lithium ions, which is beneficial to the intercalation and deintercalation of lithium ions. It can prevent reversible lithium ions from being consumed on the electrode surface or in the electrolyte, and effectively reduce the irreversible capacity, thereby making the positive electrode active material have high initial capacity and cycle capacity retention rate so as to improve energy density, room-temperature and high-temperature cycle performance of the battery.

In some embodiments, in the DSC plot of the positive electrode active material in the "78% delithiated state", the peak temperature of the main exothermic peak is optionally 225° C. or above, and further optionally 230° C. or above. Such positive electrode active materials are not prone to release oxygen during heating and high-temperature cycles, and effectively inhibit the irreversible phase transition of the positive electrode active material after delithiation, thereby improving the thermal stability of the positive electrode active material, and enhancing the high-temperature cycle performance of the battery.

In some optional embodiments, the relative deviation σ of the local mass concentration of the doping element in the particles of the positive electrode active material is 15% or less, further optionally 12% or less, and optionally 10% or less. The battery using the positive electrode active material can obtain higher energy density and high-temperature cycle performance.

In the positive electrode active material according to the embodiments of the present application, the doping element may be selected from one or more of transition metal elements other than nickel, cobalt, and manganese, and elements from groups IIA to VIA other than carbon, nitrogen, oxygen, and sulfur. Optionally, in the positive electrode active material in the "78% delithiated state", the doping element has a valence higher than +3, and further optionally has a valence higher than +3. For example, in the positive electrode active material in the "78% delithiated state", the doping element has one or more valences of +4, +5, +6, +7, and +8, and for example, one or more valences of +4, +5, and +6.

The doping element with higher valence has a stronger ability to bond with oxygen atoms, i.e., the bond energy with oxygen atoms is larger, which can effectively bind oxygen atoms and prevent the positive electrode active material from releasing oxygen during heating and high-temperature cycle process after delithiation. Thus the irreversible structural phase transition is suppressed, and the initial exothermic temperature and maximum exothermic temperature of the main exothermic peak in the DSC plot of the positive electrode active material after delithiation are increased, and the integral area and the full width at half maxima of the main exothermic peak are reduced. The positive electrode active material can have high thermal stability and high-temperature cycle stability, thereby further improving the energy density and high-temperature cycle performance of the battery.

Doping elements with higher valence can also contribute more electrons to the positive electrode active material, which can support the positive electrode to release more lithium ions, so that the energy density of the battery is further improved. In particular, the doping element has a valence state of greater than +3, which exceeds the average valence state (+3) of nickel, cobalt and manganese in lithium nickel cobalt manganese oxide, and the number of electrons contributed to the positive electrode active material is further increased, which can further improve capacity and energy density of the battery.

In the present application, the battery containing the positive electrode active material to be tested is charged to the voltage corresponding to "78% delithiated state", and then disassembled to obtain the positive electrode active material in the "78% delithiated state". Valence state of the doping element M in the "78% de-lithium state" positive electrode active material can be obtained by X-ray photoelectron spectroscopy (XPS) test. More accurately, it can be obtained through synchrotron radiation photoelectron spectroscopy (SRPES) test.

In some embodiments, the doping element M comprises one or more of Al, Si, Ti, V, Ge, Se, Zr, Nb, Ru, Pd, Sb, Te, and W. Optionally, the doping element M comprises one or more of Al, Si, Ge, Se, Zr, Ru, Sb, Te, and W. Optionally, the doping element M comprises one or more of Si, Ge, Se, Zr, Ru, Sb, Te, and W. These doping elements can better provide the above effects, and further improve energy density and high-temperature cycle performance of the lithium-ion secondary battery.

In some optional embodiments, the true doping concentration ω in the positive electrode active material satisfies 1500 µg/cm³≤ω≤60000 µg/cm³, optionally, 2300 µg/cm³≤ω≤49500 µg/cm³; optionally, 3000 µg/cm³≤ω≤35000 µg/cm³; optionally, 14810 µg/cm³≤ω≤36710 µg/cm³; optionally, 24900 µg/cm³≤ω≤25510 µg/cm³.

In this application, the true doping concentration ω in the positive electrode active material may be calculated by Formula (2):

$$\omega = \varphi \times \rho_{true} \quad \text{Formula (2)}$$

In Formula (2), ω is the true doping concentration in the positive electrode active material, in µg/cm³.

$\rho_{true}$ is true density of the positive electrode active material, in g/cm³, and is equal to the ratio of mass of the positive electrode active material to true volume of the positive electrode active material, wherein the true volume is the actual volume of solid material excluding the pores inside and between the particles of the positive electrode active material. $\rho_{true}$ may be measured by using well-known instruments and methods in the art, for example, gas volume method, which may be performed with a powder true density tester.

φ is mass concentration of doping element in the positive electrode active material in µg/g, that is, mass of doping element contained in each gram of the positive electrode active material. φ represents the content of doping elements in the overall macroscopic positive electrode active material, including doping element incorporated into the particles of the positive electrode active material, doping element enriched in other phases on the surface of the positive electrode active material particles, and doping element between the particles of the positive electrode active material. φ may be obtained through absorption spectrum of the positive electrode active material solution, such as ICP (Inductive Coupled Plasma Emission Spectrometer), XAFS (X-ray absorption fine structure spectroscopy) and other tests.

The true doping concentration of the positive electrode active material is within an appropriate range, which can increase the initial exothermic temperature and maximum exothermic temperature of the main exothermic peak in the DSC plot of the positive electrode active material in the "78% delithiated state", and reduce the integral area and the full width at half maxima of the main exothermic peak, ensuring that the positive electrode active material has a good layered crystal structure, and that the positive electrode active material has good lithium ion deintercalation/intercalation performance, so that the positive electrode active material has relatively high initial capacity and cycle capacity retention rate and thus improves the energy density and high-temperature cycle performance of the battery.

In addition, by using the positive electrode active material having true doping concentration within the above ranges, it is also ensured that the doping element is incorporated in the transition metal layer, which prevents the doping element from entering the lithium layer, and that the particles of positive electrode active material have a relatively high ability of transmission and diffusion of lithium ions, so that the battery has a higher capacity and cycling performance.

In some alternative embodiments, the deviation of mass concentration φ of doping elements in the positive electrode active material relative to average mass concentration $\overline{\eta'}$ of doping elements in particles of positive electrode active material is ε, and ε satisfies ε≤50%. Optionally, ε≤30%. Optionally, ε≤20%. Further optionally, ε≤15%, or ≤13%.

The deviation ε of mass concentration φ of doping elements in the positive electrode active material relative to average mass concentration of doping elements in particles concentration $\bar{\eta}$ f the positive electrode active material may be calculated by the following Formula (3):

$$\varepsilon = \frac{|\varphi - \bar{\eta}|}{\varphi} \qquad \text{Formula (3)}$$

The positive electrode active material satisfying ε within the above range means that the doping elements are smoothly incorporated into the particles of the positive electrode active material, and that the content of doping elements distributed in other phases on the particle surface and the doping elements embedded in the gaps between the particles is less, so that the positive electrode active material has better macro and micro consistency, and uniform structure. During the charge-discharge cycle process of the positive electrode active material, the expansion and contraction of the particles is consistent, and the stability of the particles is high, which is conducive to its higher capacity and high-temperature cycle performance.

The positive electrode active material according to the embodiments of the present application can optionally be uniformly doped within the above-mentioned true doping concentration range to ensure the consistency of the microscopic distribution and the macroscopic content of the doping elements, which can more effectively improve the thermal stability and high-temperature cycle stability of the positive electrode active material, so as to better improve energy density and high temperature cycle performance of the battery.

In some optional embodiments, the true density $\rho_{true}$ of the positive electrode active material satisfies 4.6 g/cm³≤$\rho_{true}$≤4.9 g/cm³, so that the positive electrode active material can have a higher specific capacity, thereby improving the capacity performance and energy density of the battery.

In some optional embodiments, a molar content of nickel in the lithium nickel cobalt manganese oxide is from 70% to 90% of the total molar content of nickel, cobalt, and manganese, such as from 75% to 85%. The positive electrode active material has higher specific capacity characteristics and can improve the capacity performance and energy density of the lithium-ion secondary battery.

As some examples, lithium nickel cobalt manganese oxide may satisfy the chemical formula $Li_{1+a}[Ni_xCo_yMn_zM_b]O_2$, in which M is a doping element, which is doped and substituted at one or more of nickel site, cobalt site, and manganese sites, and 0.6≤x≤0.9, 0≤y<0.3, 0≤z<0.3, 0≤a<0.2, 0<b<0.3, x+y+z+b=1. The use of the high nickel ternary positive electrode active material can enable the lithium-ion secondary battery to have higher capacity performance, energy density, and room-temperature and high-temperature cycle performance.

Optionally, 0.7≤x≤0.9, 0<y<0.3, 0<z<0.3. The high-nickel ternary positive electrode active material has high energy density and good structural stability, which is beneficial to enable the battery to have high energy density and long cycle life.

Optionally, M is selected from one or more of Al, Si, Ti, V, Ge, Se, Zr, Nb, Ru, Pd, Sb, Te, and W. Optionally, M may include one or more of Al, Si, Ge, Se, Zr, Ru, Sb, Te, and W. Optionally, M may include one or more of Si, Ge, Se, Ru, Sb, Te, and W. The doping element M ensures that the high nickel ternary positive electrode active material has high thermal stability and high temperature cycle stability, and improves the overall performance of the battery.

In addition, due to the higher valence of the doping element M, it can contribute more electrons in the positive electrode active material, and support the high nickel ternary positive electrode active material to release more lithium ions, thereby improving the capacity performance and energy density of the battery.

As other examples, lithium nickel cobalt manganese oxide can satisfy the chemical formula $Li_{1+c}[Ni_{r-d}Co_sMn_tM'_d]O_2$, where M' is a doping element, which partially substitutes the nickel site, and 0.6≤r−d≤0.9, 0≤s<0.3, 0≤t<0.3, 0≤c<0.2, 0<d<0.3, r+s+t=1. The use of the high-nickel ternary positive electrode active material can enable the lithium-ion secondary battery to have higher capacity performance, energy density, and cycle performance at room temperature and high temperature.

Optionally, 0.7≤r−d≤0.9, 0<s<0.3, 0<t<0.3. The high-nickel ternary positive electrode active material has high energy density and good structural stability, which is beneficial to enabling the battery to have high energy density and long cycle life.

Optionally, M' is selected from one or more of Al, Si, Ti, V, Ge, Se, Zr, Nb, Ru, Pd, Sb, Te, and W. Optionally, M' may comprise one or more of Al, Si, Ge, Se, Zr, Ru, Sb, Te, and W. Optionally, M' may comprise one or more of Si, Ge, Se, Ru, Sb, Te, and W. In the same way, the doping element M' ensures that the high-nickel ternary positive electrode active material has high thermal stability and high-temperature cycle stability, and improves the overall performance of the battery. In addition, the doping element M' can support the high-nickel ternary positive electrode active material to release more lithium ions, and improve the capacity performance and energy density of the lithium-ion secondary battery.

The various lithium nickel cobalt manganese oxides in the above examples can be used independently for the positive electrode active material, or a combination of any two or more of lithium nickel cobalt manganese oxides can be used for the positive electrode active material.

The volume average particle size WO of the positive electrode active material particles may be optionally from 5 μm to 20 μm, further optionally from 8 μm to 15 μm, and optionally from 9 μm to 11 μm. By using positive electrode active material with WO within the above ranges, the migration path of lithium ions and electrons in the materials is relatively short, which can further improve the transmission and diffusion performance of lithium ions and electrons in the positive electrode active material, reduce battery polarization, thereby improving the cycling performance and rate performance of lithium-ion secondary battery; in addition, it can make the positive electrode active material have a higher compacted density, and improve energy density of the battery.

By using positive electrode active material with WO within the above ranges, it is also beneficial to reduce side reactions of the electrolyte on the surface of the positive electrode active material, and reduce the agglomeration between the positive electrode active material particles, thereby improving the normal-temperature and high-temperature cycling performance and safety performance of the positive electrode active material.

The positive electrode active material may have a specific surface area of optionally from 0.2 m²/g to 1.5 m²/g, optionally from 0.3 m²/g to 1 m²/g. By using positive electrode active material with specific surface area within the above ranges, it can be ensured that the positive electrode active material has a higher active specific surface area, and at the same time helps to reduce side reactions of the electrolyte on surface of the positive electrode active material, thereby improving the capacity and cycle life of the positive electrode active material; in addition, it can also inhibit the agglomeration between particles of the positive electrode active material in the process of preparing the slurry and charging and discharging, which can improve the energy density and cycle performance of the battery.

The positive electrode active material may have a tap density of from 2.3 g/cm$^3$ to 2.8 g/cm$^3$. By using the positive electrode active material having tap density within the above range, the lithium-ion secondary battery may have a relatively high capacity performance and energy density.

The positive electrode active material may have a compacted density under a pressure of 5 tons (equivalent to 49 kN) of from 3.1 g/cm$^3$ to 3.8 g/cm$^3$. By using the positive electrode active material having compacted density within the above range, the lithium-ion secondary battery may have a relatively high capacity performance and energy density, and at the same time have good normal-temperature cycle performance and high-temperature cycle performance.

Optionally, the positive electrode active material particles may have a morphology of one or more of sphere and near-spherical.

In some embodiments, the positive electrode active material comprises secondary particles produced by aggregation of primary particles. In these embodiments, the aforementioned "particles" include secondary particles.

In this application, the volume average particle size $D_v50$, also called a median particle size, of the positive electrode active material has the well-known meaning in the art, and represents the particle size corresponding to 50% of the volume distribution of particles of the positive electrode active material. The WO of the positive electrode active material can be measured with well-known instruments and methods in the art, for example, a laser particle size analyzer (such as the Mastersizer 3000 of Malvern Instruments Co., Ltd., UK).

The specific surface area of the positive electrode active material has the well-known meaning in the art, and can be measured by instruments and methods known in the art. For example, it can be measured by using the specific surface area analysis test method with nitrogen adsorption and calculated by using the BET (Brunauer Emmett Teller) method. The specific surface area analysis test method with nitrogen adsorption may be carried out by the NOVA 2000e specific surface area and pore size analyzer of Quantachrome Instruments, US. As a particular example, the test method is as follows: taking from 8.000 g to 15.000 g of positive electrode active material in a weighed empty sample tube, stirring and weighing the positive electrode active material, and putting the sample tube into the NOVA 2000e degassing station for degassing, weighing total mass of the positive electrode active material and sample tube after degassing, and calculating mass of the positive electrode active material after degassing by subtracting mass of the empty sample tube from the total mass G. Putting the sample tube into NOVA 2000e, measuring the adsorption amount of nitrogen on surface of the positive electrode active material under different relative pressures, and calculating the monolayer adsorption amount based on the Brunauer-Emmett-Teller multilayer adsorption theory and equation, and then calculating total surface area A of positive electrode active material and the specific surface area of the positive electrode active material by A/G.

The tap density of the positive electrode active material has well-known meaning in the art, and can be measured with well-known instrument and method in the art, for example can be conveniently measured by using a tap density meter (such as FZS4-4B type).

The compacted density of the positive electrode active material has well-known meaning in the art, and can be measured with well-known instrument and method in the art, for example, can be conveniently measured by using an electronic pressure tester (such as UTM7305 type).

Next, a method for preparing a positive electrode active material is schematically illustrated. According to such method, any one of the above-mentioned positive electrode active materials can be prepared. An exemplary preparation method includes:

Mixing positive electrode active material precursor, the lithium source, and the doping element precursor, and sintering to obtain the positive electrode active material.

The positive electrode active material precursor may be one or more of oxides, hydroxides and carbonates containing Ni, Co and Mn in a stoichiometric ratio, for example, hydroxides containing Ni, Co and Mn in a stoichiometric ratio.

The positive electrode active material precursor can be obtained by a method known in the art, for example, prepared by a co-precipitation method, a gel method, or a solid phase method.

As an example, Ni source, Co source and Mn source are dispersed in a solvent to obtain a mixed solution; in a continuous co-current reaction, the mixed solution, strong alkali solution and complexing agent solution are pumped into a stirred reactor at the same time while controlling pH value of reaction solution in a range of from 10 to 13 and temperature in the reactor in a range of from 25° C. to 90° C., under inert gas protection during reaction; after completion of the reaction and upon aging, filtering, washing and vacuum drying, hydroxide containing Ni, Co and Mn is obtained.

Ni source may be a soluble nickel salt, such as one or more of nickel sulfate, nickel nitrate, nickel chloride, nickel oxalate, and nickel acetate; particularly, one or more of nickel sulfate and nickel nitrate; more particularly, nickel sulfate. Co source may be a soluble cobalt salt, such as one or more of cobalt sulfate, cobalt nitrate, cobalt chloride, cobalt oxalate and cobalt acetate; particularly, one or more of cobalt sulfate and cobalt nitrate; more particularly, cobalt sulfate. Mn source may be a soluble manganese salt, such as one or more of manganese sulfate, manganese nitrate, manganese chloride, manganese oxalate, and manganese acetate; particularly, one or more of manganese sulfate and manganese nitrate; more particularly, manganese sulfate.

The strong base may be one or more of LiOH, NaOH, and KOH, for example, NaOH. The complexing agent may be one or more of ammonia, ammonium sulfate, ammonium nitrate, ammonium chloride, ammonium citrate, and disodium ethylenediaminetetraacetic acid (EDTA), for example, ammonia.

There are no special restrictions on the solvents of the mixed solution, the strong base solution and the complexing agent solution. For example, the solvents of the mixed solution, the strong base solution and the complexing agent solution are each independently one or more of deionized water, methanol, ethanol, acetone, isopropyl alcohol and n-hexanol; such as deionized water.

The inert gas introduced during the reaction is, for example, one or more of nitrogen, argon, and helium.

The lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$) and lithium nitrate ($LiNO_3$). Particularly, the lithium source is one or more of lithium carbonate, lithium hydroxide, and lithium nitrate; more particularly, the lithium source is lithium carbonate.

The doping element precursor may be one or more of oxides, nitric acid compounds, carbonic acid compounds, hydroxide compounds, and acetic acid compounds of doping elements. For example, the doping element precursor may be oxides of doping elements, such as one or more of aluminum oxide (such as $Al_2O_3$, etc.), silicon oxide (such as $SiO_2$, SiO, etc.), titanium oxide (such as $TiO_2$, TiO, etc.), vanadium oxide (such as $V_2O_5$, $V_2O_4$, $V_2O_3$, etc.), germanium oxide (such as GeO2, etc.), selenium oxide (such as $SeO_2$, etc.), zirconia (such as $ZrO_2$, etc.), niobium oxide (such as $Nb_2O_5$, $NbO_2$, etc.), ruthenium oxide (such as $RuO_2$, etc.), palladium oxide (such as PdO, etc.), antimony oxide (such as $Sb_2O_5$, $Sb_2O_3$, etc.), tellurium oxide (such as $TeO_2$, etc.) and tungsten oxide (such as $WO_2$, $WO_3$, etc.).

Positive electrode active material precursor, lithium source and doping element precursor may be mixed by using a ball mill mixer or a high-speed mixer. The mixed materials are put into an atmosphere sintering furnace for sintering. The sintering atmosphere is an oxygen-containing atmosphere, for example, an air atmosphere or an oxygen atmosphere. Optionally, the sintering atmosphere has an oxygen concentration of from 70% to 100%, such as from 75% to 95%. The temperature for sintering is, for example, from 600° C. to 1000° C. Optionally, the sintering temperature is from 700° C. to 900° C., which is beneficial to making the dopant elements have a higher uniformity of distribution. The time for sintering may be adjusted according to the actual situation, for example, from 5 h to 25 h, and for example, from 10 h to 20 h.

It should be noted that during the preparation of the positive electrode active material, there are a variety of theoretically feasible ways to control the DSC initial exothermic temperature and exothermic peak area of the nickel-cobalt-manganese oxide positive electrode active material, such as the type of the doping element, the content of the doping element, the sintering time, the sintering temperature, the number of sintering and the oxygen concentration during sintering. In this application, some measures of solid-phase sintering doping methods are listed. By adjusting the number of sintering, doping in batches of doping elements, controlling the overall sintering time and sintering temperature, and controlling the sintering oxygen concentration, the molar content of nickel in the obtained lithium nickel cobalt manganese oxide is from 60% to 90% of the total molar content of nickel, cobalt, and manganese. The lithium nickel cobalt manganese oxide has a layered crystal structure belonging to the $R\bar{3}m$ space group; the transition metal layer comprises doping elements, and the deviation of local mass concentration of the doping elements anywhere in the particles of the positive electrode active material is 20% or less; and when the positive electrode material is delithiated to the 78% delithiated state to perform a DSC test, the initial exothermic temperature of the main exothermic peak is 200° C. or more, and the integral area of the main exothermic peak is 100 J/g or less. It should be understood that the methods described in the present description are merely used to illustrate the present application, but not intended to limit the present application.

As an example, the doping element precursor may be divided into L batches for doping of the doping element, where L may be from 1 to 5, such as from 2 to 5, or from 2 to 3. In these embodiments, the method for preparing the positive electrode active material may comprise the following steps: mixing positive electrode active material precursor, lithium source and first batch of doping element precursor, followed by first sintering process; mixing the product obtained from the first sintering process with second batch of doping element precursor, followed by second sintering process; and so on, until the product obtained from L−1 sintering process is mixed with the L batch of doping element precursor, followed by L-th sintering process, to obtain a positive electrode active material.

The doping element precursor may be equally or arbitrarily divided into L parts to perform L batches of doping.

The temperature for each of sintering processes may be the same or different. The time for each of sintering processes may be the same or different. Those skilled in the art can adjust the temperature and time for sintering according to type and amount of doping elements. For example, the temperature of each of sintering processes may be from 600° C. to 1000° C., such as from 700° C. to 900° C., and even from 800° C. to 850° C.; the time of each of sintering processes may be from 3 h to 25 h, such as from 5 h to 10 h. The total time for sintering may be from 5 h to 25 h, such as from 15 h to 25 h.

For elements that are more difficult to dope, such as doping elements with a large atomic radius, the doping uniformity can be improved by increasing the sintering temperature and/or prolonging the sintering time.

In some embodiments, the sintered product may also be crushed and sieved to obtain a positive electrode active material with optimized particle size distribution and specific surface area. There are no special restrictions on the crushing method, which can be determined according to actual needs, such as using a particle crusher.

Positive Electrode Plate

This application provides a positive electrode plate, comprising any one or more of the positive electrode active materials of this application.

By using the positive electrode active material of the present application in the positive electrode plate of embodiments of the present application, lithium-ion secondary battery can simultaneously have good room-temperature and high-temperature cycling performance and higher energy density.

In particular, the positive electrode plate includes a positive electrode current collector and a positive electrode active material layer disposed on at least one surface of the positive electrode current collector. For example, the positive electrode current collector has two opposite surfaces in its own thickness direction, and the positive electrode active material layer is laminated on either or both of the two opposite surfaces of the positive electrode current collector.

The positive electrode active material layer includes any one or more of the positive electrode active material of the present application.

In addition, the positive electrode active material layer may further include a conductive agent and a binder. In this application, there is no specific limit on the types of conductive agents and binders in the positive electrode active material layer, which can be determined according to actual needs.

As an example, the conductive agent may be one or more of graphite, superconducting carbon, acetylene black, carbon black, Ketjen black, carbon dots, carbon nanotubes, graphene, and carbon nanofibers; the binder may be one or more of styrene butadiene rubber (SBR), water-based acrylic resin, carboxymethyl cellulose (CMC), polyvinylidene difluoride (PVDF), polytetrafluoroethylene (PTFE), polyvinyl butyral (PVB), ethylene-vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin and polyvinyl alcohol (PVA).

The positive electrode current collector may be a metal foil or porous metal plate with good electrical conductivity and mechanics properties, and the material of the positive electrode current collector may be one or more of aluminum, copper, nickel, titanium, silver, and their respective alloys. The positive electrode current collector is, for example, aluminum foil.

The positive electrode plate can be prepared according to the conventional method in the art. For example, a positive electrode active material, a conductive agent, and a binder are dispersed in a solvent, which may be such as N-methylpyrrolidone (NMP) and deionized water, to form a uniform positive electrode slurry; the positive electrode slurry is coated on a positive electrode current collector; after processes including drying and rolling, a positive electrode plate is obtained.

Lithium-Ion Secondary Battery

The present application provides a lithium-ion secondary battery, comprising a positive electrode plate, a negative electrode plate, a separator and an electrolyte, wherein the positive electrode plate is any positive electrode plate of the application.

By using the positive electrode plate of the present application, the lithium-ion secondary battery can have good room-temperature and high-temperature cycling performance and high energy density at the same time.

The negative electrode plate may be a metal lithium plate.

The negative electrode plate may also comprise a negative electrode current collector and a negative electrode active material layer disposed on at least one surface of the negative electrode current collector. For example, the negative electrode current collector has two opposite surfaces in its own thickness direction, and the negative electrode active material layer is laminated on either or both of the two opposite surfaces of the negative electrode current collector.

The negative electrode active material layer includes the negative electrode active material of the present application. In the embodiments of the present application, there is no specific limit on types of negative electrode active materials, which can be determined according to actual needs. As an example, the negative electrode active material may be one or more of natural graphite, artificial graphite, mesophase micro-carbon spheres (MCMB), hard carbon, soft carbon, silicon, silicon-carbon composite, $SiO_m$ (0<m<2, such as m=1), Li—Sn alloy, Li—Sn—O alloy, Sn, SnO, $SnO_2$, lithium titanate $Li_4Ti_5O_{12}$ with spinel structure, Li—Al alloy and lithium metal.

The negative electrode active material layer may further include a conductive agent and a binder. In the embodiments of the present application, there is no specific limit on the types of conductive agents and binders in the negative electrode active material layer, which can be determined according to actual needs. As an example, the conductive agent is one or more of graphite, superconducting carbon, acetylene black, carbon black, Ketjen black, carbon dots, carbon nanotubes, graphene, and carbon nanofibers. The binders may be one or more of styrene butadiene rubber (SBR), polyvinylidene difluoride (PVDF), polytetrafluoroethylene (PTFE), polyvinyl butyral (PVB), and water-based acrylic resin.

The negative electrode active material layer may also optionally include a thickener, such as sodium carboxymethyl cellulose (CMC-Na).

The negative electrode current collector may be a metal foil or porous metal plate with good electrical conductivity and mechanics properties, and the material of the negative electrode current collector may be one or more of copper, nickel, titanium, iron, and their respective alloys. The negative electrode current collector is, for example, copper foil.

The negative electrode plate can be prepared according to the conventional method in the art. For example, a negative electrode active material, a conductive agent, a binder and thickener are dispersed in a solvent, which may be such as N-methylpyrrolidone (NMP) or deionized water, to form a uniform negative electrode slurry; the negative electrode slurry is coated on a negative electrode current collector; after processes including drying and rolling, a negative electrode plate is obtained.

In the lithium-ion secondary battery of embodiments of the present application, the electrolyte may be a solid electrolyte, such as a polymer electrolyte, an inorganic solid electrolyte, but it is not limited thereto. Electrolyte can also be used as the electrolyte solution. The above-mentioned electrolytic solution may comprise a solvent and a lithium salt dissolved in the solvent.

The solvent may be non-aqueous organic solvent, such as one or more, for example two or more, of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB), and ethyl butyrate (EB).

The lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bi strifluoromethanesulfonimide), LiTFS (lithium trifluoromethanesulfonate), LiDFOB (lithium difluorooxalate borate), LiBOB (lithium bisoxalate borate), $LiPO_2F_2$ (lithium difluorophosphate), LiDFOP (lithium difluorooxalate phosphate) and LiTFOP (lithium tetrafluorooxalate phosphate), such as one or more of $LiPF_6$ (lithium hexafluorophosphate), $LiBF_4$ (lithium tetrafluoroborate), LiBOB (lithium bisoxalate borate), LiDFOB (lithium difluorooxalate borate), LiTFSI (lithium bistrifluoromethanesulfonimide) and LiFSI (lithium bisfluorosulfonimide).

The electrolyte solution may also optionally contain other additives, such as one or more of vinylene carbonate (VC), vinyl ethylene carbonate (VEC), fluoroethylene carbonate (FEC), difluoroethylene carbonate (DFEC), trifluoropropylene carbonate (TFPC), succinonitrile (SN), adiponitrile (ADN), glutaronitrile (GLN), hexanetrinitrile (HTN), 1,3-propane sultone (1,3-PS), ethylene sulfate (or 1,3,2-Dioxathiolane-2,2-dioxide, DTD), methyl ene methanedisulfonate (MMDS), 1-propene-1,3-sultone (PST), 4-methylvinyl sulfate (PCS, or propane 1,2-cyclic sulfate), 4-ethylvinyl sulfate (PES), 4-propyl ethylene sulfate (PEGLST), propylene sulfate (TS), 1,4-butane sultone (1,4-BS), ethylene sulfite (DTO), dimethyl sulfite (DMS), diethyl sulfite (DES), sulfonic ester cyclic quaternary ammonium salt, tris(trimethylsilane) phosphate (TMSP) and tris(trimethylsilane)borate (TMSB), but not limited thereto.

There is no specific limit on the separator in the lithium-ion secondary battery of the embodiments of the present application, and any well-known porous structure separator with electrochemical stability and mechanical stability may be used, such as one or more of single-layer or multi-layer films of glass fiber, non-woven fabric, polyethylene (PE), polypropylene (PP) and polyvinylidene fluoride (PVDF).

The positive electrode plate and the negative electrode plate each are alternately stacked, and the separator is disposed between the positive electrode plate and the negative electrode plate to separate the positive electrode plate from the negative electrode plate, thereby forming an electrode assembly, optionally after winding. The electrode assembly is placed in a case in which an electrolyte is injected, and then the case is sealed, thereby obtaining a lithium-ion secondary battery.

Figure 4:
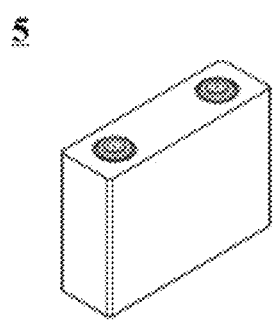
FIG. 4 is a schematic diagram of a lithium-ion secondary battery according to an embodiment of the present application.

The shape of the lithium-ion secondary battery is not particularly limited in the present application, and may be cylindrical, rectangular, or any other shape. FIG. 4 illustrates a lithium-ion secondary battery 5 having a rectangular structure as an example.

In some embodiments, the secondary battery may include an outer packaging. The outer packaging is used to encapsulate the positive electrode plate, the negative electrode plate and the electrolyte.

Figure 5:
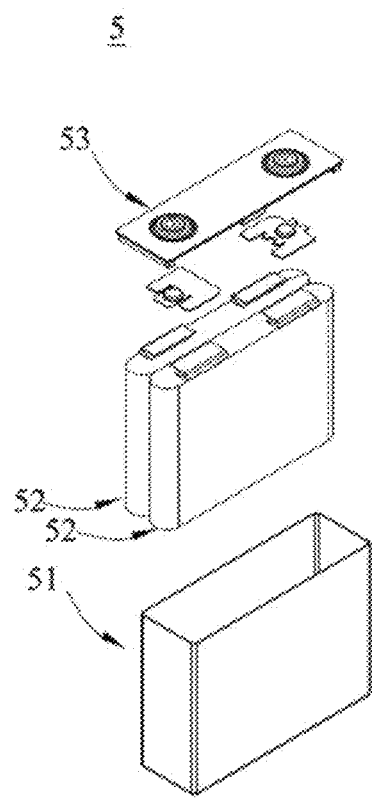
FIG. 5 is an exploded view of FIG. 4.

In some embodiments, referring to FIG. 5, the outer packaging may include a housing 51 and a cover plate 53. In an example, the housing 51 may include a bottom plate and a side plate connected to the bottom plate, and the bottom plate and the side plate are combined to form an accommodating cavity. The housing 51 has an opening communicating with the accommodating cavity, and the cover plate 53 can cover the opening to close the accommodating cavity.

The positive electrode plate, the negative electrode plate, and the separator may be stacked or wounded into an electrode assembly 52. The electrode assembly 52 is encapsulated in the accommodating cavity. The electrolyte may be an electrolytic solution, and the electrolytic solution is infiltrated in the electrode assembly 52. The number of electrode assembly 52 contained in the lithium-ion secondary battery 5 can be one or several, which can be adjusted according to requirements.

In some embodiments, the outer packaging of the lithium-ion secondary battery may be a hard housing, such as a hard plastic housing, aluminum housing, steel housing, or the like. The outer packaging of the secondary battery may also be a soft pack, such as a pouch type soft pack. The material of the soft pack may be plastic, for example, including one or more of polypropylene (PP), polybutylene terephthalate (PBT), polybutylene succinate (PBS), and the like.

In some embodiments, the lithium-ion secondary battery can be assembled into a battery module. The battery module may include a plurality of lithium-ion secondary batteries, and the specific number can be adjusted according to the application and capacity of the battery module.

Figure 6:
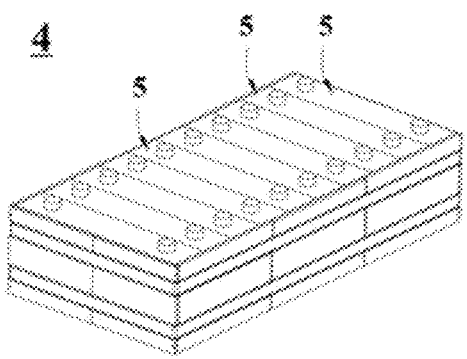
FIG. 6 is a schematic diagram of a battery module according to an embodiment of the present application.

FIG. 6 shows a battery module 4 as an example. Referring to FIG. 6, in the battery module 4, a plurality of lithium-ion secondary batteries 5 are sequentially arranged along a length direction of the battery module 4. Apparently, the secondary batteries 5 may also be disposed in any other manner. Further, a plurality of lithium-ion secondary batteries 5 can be fixed by a fastener.

Optionally, the battery module 4 may further include a casing having a receiving space, in which a plurality of lithium-ion secondary batteries 5 are received.

In some embodiments, the above-mentioned battery module may also be assembled into a battery pack, and the number of battery modules contained in the battery pack can be adjusted according to the application and capacity of the battery pack.

Figure 7:
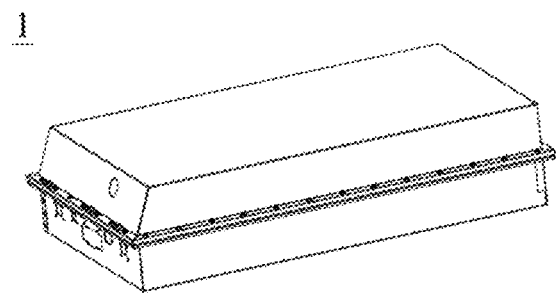
FIG. 7 is a schematic diagram of a battery pack according to an embodiment of the present application.
Figure 8:
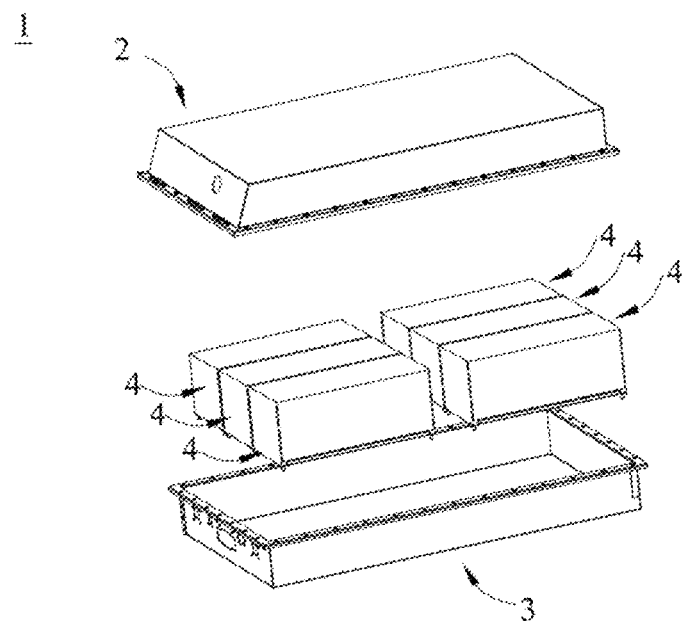
FIG. 8 is an exploded view of FIG. 7.

FIGS. 7 and 8 show a battery pack 1 as an example. With reference to FIGS. 7 and 8, the battery pack 1 may include a battery case and a plurality of battery modules 4 provided in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

The present application also provides an apparatus, the apparatus including at least one of the lithium-ion secondary battery, battery module or battery pack according to the present application. The lithium-ion secondary battery, battery module or battery pack may be used as a power source of the apparatus or as an energy storage unit of the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc. The apparatus can adopt a lithium-ion secondary battery, a battery module, or a battery pack, according to application requirements.

Figure 9:
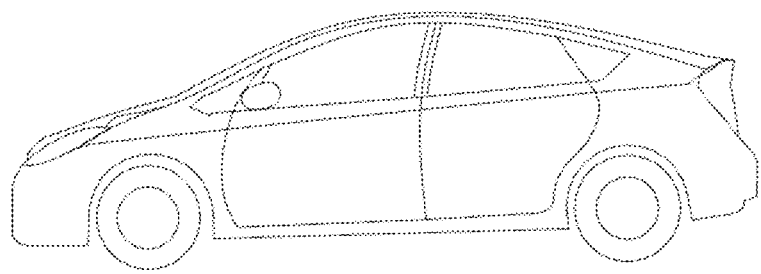
FIG. 9 is a schematic diagram of an apparatus according to an embodiment of the present application in which a lithium-ion secondary battery is used as a power source.

FIG. 9 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and a lithium-ion secondary battery can be used as a power source.

EXEMPLARY EMBODIMENTS

Embodiment 1. A positive electrode active material, comprising a lithium nickel cobalt manganese oxide, wherein the molar content of nickel in the lithium nickel cobalt manganese oxide is 60%-90% of the total molar content of nickel, cobalt and manganese, and the lithium nickel cobalt manganese oxide has a layered crystal structure of a space group R3 m;

a transition metal layer of the lithium nickel cobalt manganese oxide comprises a doping element, and the local mass concentration of the doping element in particles of the positive electrode active material has a relative deviation of 20% or less; and in a differential scanning calorimetry spectrum of the positive electrode active material in a 78% delithiation state, an initial exothermic temperature of a main exothermic peak is 200° C. or more, and an integral area of the main exothermic peak is 100 J/g or less.

Embodiment 2. The positive electrode active material according to embodiment 1, wherein a half-peak width of the main exothermic peak is 30° C. or less; or a peak temperature of the main exothermic peak is 230° C. or more.

Embodiment 3. The positive electrode active material according to embodiment 1 or 2, wherein the local mass concentration of the doping element in the particles of the positive electrode active material has a relative deviation of 15% or less.

Embodiment 4. The positive electrode active material according to any one of embodiments 1-3, wherein when the positive electrode active material is in the 78% delithiation state, the doping element has a valence of greater than +3, and optionally has a valence selected from one or more of +4, +5, +6, +7, and +8.

Embodiment 5. The positive electrode active material according to any one of embodiments 1-4, wherein the doping element comprises one or more of Al, Si, Ti, V, Ge, Se, Zr, Nb, Ru, Pd, Sb, Te, and W; optionally, the doping element comprises one or more of Al, Si, Ge, Se, Zr, Ru, Sb, Te, and W; and optionally, the doping element comprises one or more of Si, Ge, Se, Ru, Sb, Te, and W.

Embodiment 6. The positive electrode active material according to any one of embodiments 1-5, wherein the positive electrode active material has a true density $\rho_{true}$ satisfying: $4.6 \text{ g/cm}^3 \leq \rho_{true} \leq 4.9 \text{ g/cm}^3$.

Embodiment 7. The positive electrode active material according to any one of embodiments 1-6, wherein the positive electrode active material has a true doping concentration ω satisfying: $2300 \text{ μg/cm}^3 \leq \omega \leq 49500 \text{ μg/cm}^3$; optionally, $3000 \text{ μg/cm}^3 \leq \omega \leq 35000 \text{ μg/cm}^3$; and optionally, $14810 \text{ μg/cm}^3 \leq \omega \leq 36710 \text{ μg/cm}^3$.

Embodiment 8. The positive electrode active material according to any one of embodiments 1-7, wherein the mass concentration of the doping element in the positive electrode active material has a deviation $\varepsilon \leq 50\%$; optionally, $\varepsilon \leq 30\%$; and further optionally, $\varepsilon \leq 20\%$, relative to an average mass concentration of the doping element in the particles of the positive electrode active material.

Embodiment 9. The positive electrode active material according to any one of embodiments 1-8, wherein the positive electrode active material further satisfies one or more of the following (1)-(4):

(1) the positive electrode active material has a volume average particle size WO of 5 μm to 20 μm, optionally from 8 μm to 15 μm, and further optionally from 9 μm to 11 μm;

(2) the positive electrode active material has a specific surface area of 0.2 m²/g to 1.5 m²/g, and optionally from 0.3 m²/g to 1 m²/g;

(3) the positive electrode active material has a tap density of 2.3 g/cm³ to 2.8 g/cm³; and (4) the positive electrode active material has a compacted density of 3.1 g/cm³-3.8 g/cm³ under a pressure of 5 tons (equivalent to 49 kN).

Embodiment 10. The positive electrode active material according to any one of embodiments 1-9, wherein the lithium nickel cobalt manganese oxide satisfies a chemical formula $Li_{1+a}[Ni_xCo_yMn_zM_b]O_2$, wherein M is the doping element, M is selected from one or more of Al, Si, Ti, V, Ge, Se, Zr, Nb, Ru, Pd, Sb, Te, and W, $0.7 \leq x \leq 0.9$, $0 < y < 0.3$, $0 < z < 0.3$, $0 \leq a < 0.2$, $0 < b < 0.3$, and $x+y+z+b=1$; or the lithium nickel cobalt manganese oxide satisfies a chemical formula $Li_{1+c}[Ni_{r-d}Co_sMn_tM'_d]O_2$, wherein M' is the doping element, M' is selected from one or more of Al, Si, Ti, V, Ge, Se, Zr, Nb, Ru, Pd, Sb, Te, and W, $0.7 \leq r-d \leq 0.9$, $0 < s < 0.3$, $0 < t < 0.3$, $0 \leq c < 0.2$, $0 < d \leq 0.3$, and $r+s+t=1$.

Embodiment 11. A method for preparing a positive electrode active material, comprising the following steps:

mixing a positive electrode active material precursor, a lithium source and a doping element precursor to obtain a mixture, wherein the positive electrode active material precursor is selected from one or more of oxides, hydroxides and carbonates containing Ni, Co and Mn, and the molar content of nickel is from 60% to 90% of the total molar content of nickel, cobalt and manganese; and subjecting the mixture to sintering treatment to obtain the positive electrode active material;

wherein the positive electrode active material comprises a lithium nickel cobalt manganese oxide, and the lithium nickel cobalt manganese oxide has a layered crystal structure of a space group R $\bar{3}$ m;

a transition metal layer of the lithium nickel cobalt manganese oxide comprises a doping element, and the local mass concentration of the doping element in particles of the positive electrode active material has a relative deviation of 20% or less; and in a differential scanning calorimetry spectrum of the positive electrode active material in a 78% delithiation state, an initial exothermic temperature of a main exothermic peak is 200° C. or more, and an integral area of the main exothermic peak is 100 J/g or less.

Embodiment 12. The method according to embodiment 11, wherein the doping element precursor is selected from one or more of aluminum oxides, silicon oxides, titanium oxides, vanadium oxides, germanium oxides, selenium oxides, zirconium oxides, niobium oxides, ruthenium oxides, palladium oxides, antimony oxides, tellurium oxides, and tungsten oxides; and optionally, the doping element precursor is selected from one or more of $Al_2O_3$, $SiO_2$, SiO, $TiO_2$, TiO, $V_2O_5$, $V_2O_4$, $V_2O_3$, $GeO_2$, $SeO_2$, $ZrO_2$, $Nb_2O_5$, $NbO_2$, $RuO_2$, PdO, $Sb_2O_5$, $Sb_2O_3$, $TeO_2$, $WO_2$, and $WO_3$.

Embodiment 13. The method according to embodiment 11 or 12, wherein the sintering treatment satisfies at least one of the following (a)-(c):

(a) the atmosphere of the sintering treatment is an oxygen-containing atmosphere; optionally, the oxygen concentration of the sintering atmosphere is from 70% to 100%, and optionally from 75% to 95%;

(b) the temperature of the sintering treatment is from 600° C. to 1000° C., and optionally from 700° C. to 900° C.; and (c) the time of the sintering treatment is from 5 h to 25 h, and optionally from 10 h to 20 h.

Embodiment 14. The method according to any one of embodiments 11-13, wherein the doping element precursor is equally divided into L parts or randomly divided into L parts and doped in L batches, wherein L is from 1 to 5, and optionally from 2 to 3;

the method optionally comprises: mixing the positive electrode active material precursor, the lithium source, and a first batch of doping element precursor, and performing first sintering treatment; mixing the product of the first sintering treatment with a second batch of doping element precursor, and performing second sintering treatment; and so on until the product of the (L−1)-th sintering treatment is mixed with the L batch of doping element precursor; and performing L-th sintering treatment to obtain the positive electrode active material.

Embodiment 15. The method according to embodiment 14, wherein the method satisfies at least one of the following (a)-(c):

(a) the temperature of each sintering treatment is from 600° C. to 1000° C., optionally from 700° C. to 900° C., and further optionally from 800° C. to 850° C.;

(b) the time of each sintering treatment is from 3 h to 25 h, and optionally from 5 h to 10 h; and (c) the total sintering time is from 5 h to 25 h, and optionally from 15 h to 25 h.

Embodiment 16. A positive electrode plate, comprising a positive electrode current collector and a positive electrode active material layer disposed on the positive electrode current collector, the positive electrode active material layer comprising the positive electrode active material according to any one of embodiments 1-10 or the positive electrode active material obtained by the preparation method according to any one of embodiments 11-15.

Embodiment 17. A lithium-ion secondary battery, comprising the positive electrode plate according to embodiment 16.

Embodiment 18. A battery module, comprising the lithium-ion secondary battery according to embodiment 17.

Embodiment 19. A battery pack, comprising the lithium-ion secondary battery according to embodiment 17 or the battery module according to embodiment 18.

Embodiment 20. An apparatus, comprising at least one of the lithium-ion secondary battery according to embodiment 17, the battery module according to embodiment 18, or the battery pack according to embodiment 19.

EXAMPLES

The following examples are intended to describe the present application more specifically, merely for the purpose of illustration. Various modifications and variations within the scope of the present application are apparent to those skilled in the related art. Unless otherwise stated, all parts, percentages, and ratios described in the following embodiments are based on weight, and all reagents used in the embodiments are commercially available or synthesized according to conventional methods and can be directly used without further treatment, and all instruments used in the embodiments are commercially available.

Example 1

Preparation of Positive Electrode Active Material

The doping element was Sb. The doping element precursor antimony oxide $Sb_2O_3$ was roughly equally divided into three batches for Sb doping.

The positive electrode active material precursor $[Ni_{0.8}Co_{0.1}Mn_{0.1}](OH)_2$, lithium hydroxide LiOH and the first batch of antimony oxide $Sb_2O_3$ were added to the high-speed mixer for mixing for 1 h to obtain a mixture. The molar ratio of the positive electrode active material precursor to the lithium hydroxide Li/Me was 1.05, Me represented the total molar amount of Ni, Co, and Mn in the positive electrode active material precursor; the mixture was put into the atmosphere sintering furnace for the sintering. The sintering was carried out at sintering temperature of 830° C. for sintering time of 5 h, under the sintering atmosphere of an oxygen-containing atmosphere with 02 concentration of 90%.

The product of the first sintering and the second batch of antimony oxide were added to the high-speed mixer for 1 h to undergo the second sintering. The second sintering was carried out at the same sintering temperature, sintering time and sintering atmosphere as the first sintering.

The product of the second sintering and the third batch of antimony oxide were added to the high-speed mixer for 1 h, followed by the third sintering. The sintering temperature and sintering atmosphere were the same as the previous two sintering, and the sintering time was 10 h. The total sintering time was 20 h.

The product of the third sintering was crushed and sieved, to obtain the high-nickel ternary positive electrode active material. The antimony oxide was added in an amount so that the true doping concentration of Sb in the positive electrode active material was 25110 μg/cm³.

Preparation of Electrolyte Solution

A solvent was obtained after mixing EC, DEC, and DMC in a volume ratio of 1:1:1, and then the lithium salt $LiPF_6$ was dissolved in the above solvent to obtain an electrolyte solution, in which the concentration of $LiPF_6$ was 1 mol/L.

Preparation of Button Battery

The positive electrode active material as prepared above, carbon black as a conductiveagent and PVDF as a binder in accordance with a weight ratio of 90:5:5 were dispersed in the solvent N-methylpyrrolidone (NMP); after mixed uniformly, a positive electrode slurry was obtained; the positive electrode slurry was uniformly coated on an aluminum foil as the positive electrode current collector aluminum foil. After drying and cold-pressing, a positive electrode plate was obtained.

In a button battery case, the positive electrode plate, a separator and a metal lithium sheet were laminated in sequence, and the above-mentioned electrolyte solution was injected to assemble a button battery.

Preparation of Full Battery

The positive electrode active material as prepared above, acetylene black as a conductive agent and PVDF as a binder in accordance with a weight ratio of 94:3:3 were dispersed in the solvent NMP; after mixed uniformly, a positive electrode slurry was obtained; the positive electrode slurry was uniformly coated on the positive electrode current collector aluminum foil. After drying and cold-pressing, a positive electrode plate was obtained.

Artificial graphite and hard carbon as the negative electrode active material, acetylene black as a conductive agent, styrene butadiene rubber (SBR) as a binder and sodium carboxymethyl cellulose (CMC-Na) as a thickener in accordance with weight ratio of 90:5:2:2:1 were dispersed in deionized water; after mixed uniformly, a negative electrode slurry was obtained; the negative electrode slurry was uniformly coated on the negative electrode current collector aluminum foil. After drying and cold-pressing, the negative electrode sheet was obtained.

Polyethylene (PE) porous polymer film was used as a separator. The positive electrode plate, the separator, and the negative electrode plate were laminated in sequence, to obtain a bare electrode assembly; the bare electrode assembly was placed in an outer package followed by injecting the above electrolyte solution in the outer package, and then after the steps of formation and the like the outer package was packaged to obtain a full battery.

Examples 2-11, Examples 13-17 and Comparative Examples 1-4

Example 1 was repeated except that: the relevant parameters in the preparation step of the positive electrode active material were changed; the type and the amount of doping elements in each batch and the sintering temperature of from 600° C. to 900° C., the sintering atmosphere was an oxygen-containing atmosphere with an 02 concentration of 75% to 95% and the total sintering time of from 10 h to 20 h were adjusted, to obtain the positive electrode active material with predetermined doping element type, doping amount and doping uniformity, wherein Example 4 and Example 5 involving doping of several elements, while the amounts of doping elements each were basically the same; and no doping element was added in Comparative Example 1. The other parameters were shown in Table 1 and Table 2.

Example 12 and Comparative Example 5

Example 1 was repeated except that: the doping element in Example 12 was added in a single batch, and the sintering temperature was 720° C.; the doping element in Comparative Example 5 was added in a single batch, and the sintering temperature was 650° C.; other parameters were shown in Table 1 and Table 2.

Examples 18-19

In Example 18, Example 1 was repeated except that: the temperature for first sintering was 800° C. and the time for first sintering was 7 h; the temperature for second sintering was 750° C. and the time for second sintering was 2 h; and the temperature for third sintering was 700° C. and the time for third sintering was 2 h, wherein the amount of the second batch of doping elements were 40%, the amount of the third batch of doping elements were 10%, relative to the amount of the total doping elements. The other parameters were shown in Table 1 and Table 2.

In Example 19, Example 1 was repeated except that: the temperature for first sintering was 750° C. and the time for first sintering was 6 h; the temperature for second sintering was 700° C. and the time for second sintering was 1 h; and the temperature for third sintering was 650° C. and the time for third sintering was 1 h, wherein the amount of the second batch of doping elements were 50%, the amount of the third batch of doping elements were 20%, relative to the amount of the total doping elements. The other parameters were shown in Table 1 and Table 2.

Examples 20-21 and Comparative Examples 6-7

Example 1 was repeated except that: in Examples 20 and 21 and Comparative Example 7, the positive electrode active material precursors were $[Ni_{0.6}Co_{0.2}Mn_{0.2}](OH)_2$, and different types of doping elements were added; in Comparative Example 6, the positive electrode active material precursor was $[Ni_{0.6}Co_{0.2}Mn_{0.2}](OH)_2$, without addition of doping elements; other parameters were shown in Table 1 and Table 2.

Test Section

1) Test of DSC of the "78% Delithiated State" Positive Electrode Active Material At 25° C., 18 button batteries were charged at 1 C constant current to the upper limit of the charge/discharge cut-off voltage, then charged at constant voltage until the current was ≤0.05 mA, and after standing for 2 minutes, then discharged at 1 C constant current to the lower limit of charge/discharge cut-off voltage.

Subsequently, the 18 button batteries after the above charge and discharge were charged to 2.8V, 2.9V, 3.0V, 3.1V, 3.2V, 3.3V, . . . 4.0V, 4.1V, 4.2V, 4.3V, 4.4V, 4.5V (that is, the charging voltage interval was 0.1V) at a rate of 0.1 C, respectively. From each of the charged button batteries, positive electrode plate was disassembled in a drying room and taken as a sample. After weighing and recording mass of the sample, the sample was placed into a digestion tank, followed by slowly adding 10 mL of aqua regia as a digestion reagent; then the digestion tank was put into CEM-Mars5 microwave digestion instrument in which the digestion was carried out at a microwave emission frequency of 2450 Hz; the digested sample solution was transferred to a volumetric flask and shaken, and the sample was placed into the PE7000DV ICP-OES sampling system. The mass concentrations of Li, O, Ni, Co, Mn and doping elements were measured for the positive electrode active material under 0.6 MPa argon pressure at 1300 W radio frequency power. Based on the mass concentrations of elements, after conversion, the chemical formula under each voltage and thus the delithiated state under each voltage were obtained. When the chemical formula of the positive electrode active material was $Li_{0.22}Ni_{0.8}Co_{0.1}Mn_{0.1}O_2$, the corresponding delithiated state was $(1-0.22)\times 100\%=78\%$, and the corresponding voltage was the voltage corresponding to the 78% delithiated state.

A button battery was charged to the voltage corresponding to the "78% delithited state" at a rate of 0.1 C. Afterwards, the battery was disassembled with scissors in drying room, and the entire positive electrode plate was taken out and placed into a beaker in which an appropriate amount of high purity anhydrous dimethyl carbonate (DMC) was poured and then replaced every 8 hours; after washed 3 times in succession, the sample was put into the vacuum standing box in the drying room, and pumped to vacuum state of −0.096 MPa, and dried for 12 hours; the dried positive electrode plate was scraped with a blade in the drying room, 4.95 mg~5.05 mg of the positive electrode active material powder were weighed into the high-pressure crucible of the STA449F3-QMS403C differential scanning calorimeter and sealed; the sample was heated at the heating rate of 10° C./min, and the data of the sample heat flow change with temperature was recorded to obtain the DSC plot and thus the exothermic onset temperature, full width at half maxima, integral area and maximum exothermic temperature of the main exothermic peak.

The positive electrode in the button battery can also be a positive electrode plate that was dismantled from the full battery in a drying room, and the middle area was selected to punch out an appropriate size as the positive electrode plate of the button battery.

Figure 3:
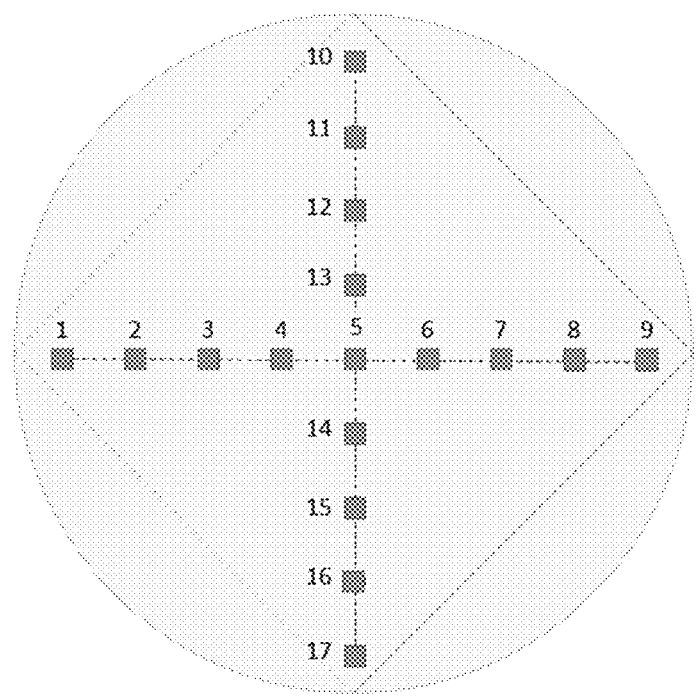
FIG. 3 is a schematic diagram showing locations taken for testing relative deviation of local mass concentration of doping elements in particles of the positive electrode active materials of Examples 1-21 and Comparative Examples 1-7.

2) Test of Relative Deviation σ of Local Mass Concentration of Doping Elements in Positive Electrode Active Material Particles 2 g of positive electrode active material powder sample was weighed, and evenly sprinkled on the sample stage with conductive adhesive, followed by lightly pressing to fix the powder; or, 1 cm×1 cm electrode plate was cut out from positive electrode plate of battery and pasted on the sample stage, as the sample to be tested. The sample stage was loaded into vacuum sample chamber and fixed, and the IB-09010CP type cross-section polisher manufactured by JEOL was used to prepare cross-section of the positive electrode active material (as shown in FIG. 3). As shown in FIG. 3, points were taken at 17 positions in the secondary particle cross section, with each point having an area of 20 nm×20 nm. X-Max energy spectrometer (EDS) detector from Oxford Instruments Group in United Kingdom was used in combination with Sigma-02-33 type scanning electron microscope (SEM) from ZEISS in Germany, to test mass concentrations of doping elements at the 17 positions, by using the following test method: configuring Li, O, Ni, Co, Mn and doping elements as elements to be detected, and setting SEM parameters including 20 kV acceleration voltage, 60 μm aperture, 8.5 mm working distance, 2.335 A current, performing EDS-SEM test until the spectrum area reached 250000 cts or more (controlled by acquisition time and acquisition rate), and collecting data to get the mass concentrations $\eta_1, \eta_2, \eta_3, \ldots, \eta_{17}$ of the doping elements at the positions.

An average mass concentration $\bar{\eta}$ of the doping element in the particles of the positive electrode active material was determined as follows: using the above-mentioned EDS-SEM test method, with the tested area, as shown in the dashed box in FIG. 3, covering all the above-mentioned points scanned in the particles a of the positive electrode active material without exceeding the cross-section of the secondary particle. particle.

The relative deviation σ of local mass concentration of doping elements in the particles of the positive electrode active material was calculated according to Formula (1).

To test the active material of the positive electrode of the battery, the battery was disassembled with scissors in drying room, taken out the entire positive electrode plate and placed into a beaker and poured an appropriate amount of high purity anhydrous dimethyl carbonate (DMC), the DMC was replaced every 8 hours; after washing 3 times in succession, the sample was put into the vacuum standing box in the drying room, and pumped to vacuum state of −0.096 MPa, and dried for 12 hours. 1 cm×1 cm electrode plate was cut out from positive electrode plate of battery and pasted on the sample stage with conductive adhesive; or 2 g of positive electrode active material powder sample was scraped in the drying room, then the sample was tested as the method above.

3) Test of True Doping Concentration of Positive Electrode Active Material:

True density $\rho_{true}$ of positive electrode active material was measured by the TD2400 type powder true density tester from Beijing Builder Electronic Technology Co., Ltd. by using the following testing method: taking a certain mass of positive electrode active material and placing in sample cup at 25° C., recording mass m of the positive electrode active material; putting the sample cup containing the positive electrode active material into test chamber of the true density meter, sealing test system, passing in inert gas with small molecular diameter such as helium or nitrogen, measuring gas pressure in the sample chamber and the expansion chamber, and then measuring true volume V of the measured material according to Bohr's law PV=nRT, and calculating the true density $\rho_{true}$ of the secondary particles by m/V. n was the molar mass of gas in sample cup; R was the ideal gas constant, 8.314; T was the ambient temperature, 298.15K.

The 7000DV inductively coupled plasma-Optical Emission spectrometers (ICP-OES) sampling system available from PerkinElmer (PE) in the United States was used to test mass concentration φ of doping elements in the positive electrode active material, by using the following testing method: taking electrode plate containing the positive electrode active material and punching into a disc with a total mass greater than 0.5 g, or taking at least 5 g of positive electrode active material powder sample, weighing and recording sample mass and putting the sample into a digestion tank, slowly adding 10 mL of aqua regia as a digestion reagent, assembling, then putting the digestion tank into the Mars5 microwave digestion instrument from American CEM company, and performing digestion at microwave emission frequency of 2450 Hz; transferring the digested sample solution to a volumetric flask and shaking, sampling and putting into the ICP-OES sampling system, testing mass concentration of doping elements in the positive electrode active material under 0.6 MPa argon pressure at 1300 W radio frequency power.

Then true doping concentration ω of the positive electrode active material was calculated according to the aforementioned Formula (2).

4) Test of the Chemical Valence of the Doping Element M in the "78% Delithiated State" Positive Electrode Active Material A battery containing positive electrode active material to be tested was charged to the voltage corresponding to the "78% delithiated state", following by disassembling the battery with scissors in drying room, taking out the entire positive electrode plate and placing into a beaker and pouring an appropriate amount of high purity anhydrous dimethyl carbonate (DMC), replacing the DMC every 8 hours; after washing 3 times in succession, the sample was put into the vacuum standing box in the drying room, and pumped to vacuum state of −0.096 MPa, and dried for 12 hours; the dried positive electrode plate was used as sample in XPS test.

The plate sample was pasted on the sample stage of AXIS Supra XPS from Kratos by using 3M insulating tape. After automatic sample injection, the system was vacuum pumped for at least 1 hour. A monochromatic Al target (Al Kα, 1486.6 eV) was used as excitation source, fine spectra of doping elements was scanned with a step length of 0.1 eV and a pass energy of 40 eV. Valence state of element was determined by splitting peak of specific elements with reference to the standard XPS characteristic peaks.

5) Test of Initial Gram Capacity of Button Battery

At 25° C., button batteries were charged at 0.1 C constant current to the upper limit of the charge/discharge cut-off voltage and then charged at constant voltage until the current was 0.05 mA or smaller, and after kept standing for 2 minutes, they were then discharged at 0.1 C constant current to the lower limit of the charge/discharge cut-off voltage. The discharge capacity at this time was the initial gram capacity of the button battery.

6) Test of Initial Gram Capacity of Full Battery

At 25° C., the battery was charged at ⅓ C constant current to the upper limit of the charge/discharge cut-off voltage and then charged at constant voltage until the current was 0.05 mA or smaller, and after kept standing for 5 minutes, it was then discharged at ⅓ constant current to the lower limit of charge/discharge cut-off voltage. The discharge capacity at this time was the initial gram capacity of the full battery.

7) Tests of High Temperature Cycling Performance of Full Battery

At 45° C., the battery was charged at 1 C constant current to the upper limit of the charge/discharge cut-off voltage and then charged at constant voltage until the current was 0.05 mA or smaller, and after kept standing for 5 minutes, it was then discharged at 1 C constant current to the lower limit of the charge/discharge cut-off voltage. This was a charge and discharge cycle. The discharge capacity at this time was recorded as the discharge specific capacity $D_1$ at the first cycle. The battery was subjected to 400 cycles of charge and discharge tests according to the above method, and the discharge capacity after the 400th cycle, $D_{400}$, was recorded.

Capacity retention rate of full battery at 45° C., 1 C/1 C 400 cycles (%)=$D_{400}/D_1$×100%

In the above tests 1), 5), 6), and 7): in Examples 1-19 and Comparative Examples 1-5, the charge/discharge cut-off voltage of button battery was from 2.8V to 4.25V, and the charge/discharge cut-off voltage of full battery was from 2.8V to 4.2V; in Example 20-21 and Comparative Examples 6-7, the charge/discharge cut-off voltage of button battery was from 2.8V to 4.35V, and the charge/discharge cut-off voltage of full battery was from 2.8V to 4.3V.

The test results of Examples (Ex.) 1 to 21 and Comparative Examples (CE) 1 to 7 were shown in Tables 2 and 3.

TABLE 1

| No. | Type of doping element | Mass ratio of batches | Oxygen concentration in sintering atmosphere (%) | First sintering Temp. (° C.) | First sintering Time (h) | Second sintering Temp. (° C.) | Second sintering Time (h) | Third sintering Temp. (° C.) | Third sintering Time (h) |
|---|---|---|---|---|---|---|---|---|---|
| Ex. 1 | Sb | 1:1:1 | 90 | 830 | 5 | 830 | 5 | 830 | 10 |
| Ex. 2 | Te | 1:2:1 | 85 | 825 | 4 | 800 | 7 | 815 | 8 |
| Ex. 3 | Si | 2:3:2 | 88 | 785 | 5 | 825 | 4 | 835 | 10 |
| Ex. 4 | Zr + W | 1:2:3 | 79 | 810 | 7 | 805 | 5 | 845 | 6 |
| Ex. 5 | Sb + Ru + Te | 1:2:1 | 83 | 800 | 3 | 835 | 6 | 795 | 11 |
| Ex. 6 | Sb | 2:3:4 | 82 | 825 | 5 | 800 | 8 | 825 | 5 |
| Ex. 7 | Sb | 2:3:2 | 83 | 830 | 3 | 785 | 7 | 815 | 8 |
| Ex. 8 | Sb | 1:2:2 | 86 | 825 | 6 | 805 | 4 | 830 | 7 |
| Ex. 9 | Sb | 1:2:1 | 84 | 810 | 4 | 815 | 5 | 825 | 6 |
| Ex. 10 | Sb | 1:2:3 | 85 | 835 | 6 | 825 | 3 | 845 | 9 |
| Ex. 11 | Ru | 1:1:2 | 83 | 800 | 3 | 795 | 6 | 825 | 10 |
| Ex. 12 | Ru | / | 78 | One-batch doping; one sintering at 720° C. for 20 h | | | | | |
| Ex. 13 | Ti | 1:2:2 | 80 | 805 | 5 | 835 | 4 | 800 | 10 |
| Ex. 14 | Zr | 1:2:1 | 81 | 825 | 4 | 810 | 6 | 815 | 6 |
| Ex. 15 | Al | 1:2:3 | 85 | 810 | 5 | 825 | 3 | 830 | 8 |
| Ex. 16 | Ge | 1:2:2 | 82 | 815 | 6 | 795 | 4 | 825 | 7 |
| Ex. 17 | Se | 2:3:2 | 81 | 800 | 5 | 785 | 5 | 825 | 7 |
| Ex. 18 | Sb | 5:4:1 | 78 | 800 | 7 | 750 | 2 | 700 | 2 |
| Ex. 19 | Sb | 3:5:2 | 77 | 750 | 6 | 700 | 1 | 650 | 1 |
| CE 1 | / | / | 89 | One sintering at 830° C. for 20 h | | | | | |
| CE 2 | Y | 1:1:2 | 87 | 815 | 5 | 810 | 3 | 825 | 10 |
| CE 3 | Sb | 1:2:1 | 88 | 825 | 6 | 805 | 5 | 835 | 8 |
| CE 4 | Sb | 1:2:3 | 91 | 830 | 4 | 785 | 7 | 845 | 7 |
| CE 5 | Ru | / | 76 | One-batch doping; one sintering at 650° C. for 20 h | | | | | |
| Ex. 20 | Sb | 2:3:2 | 85 | 800 | 4 | 835 | 5 | 800 | 10 |
| Ex. 21 | Ru | 1:2:2 | 87 | 815 | 6 | 825 | 7 | 795 | 7 |
| CE 6 | / | / | 88 | One sintering at 830° C. for 20 h | | | | | |
| CE 7 | Y | 1:1:2 | 85 | 825 | 7 | 835 | 5 | 805 | 8 |

In Table 1, the mass ratio of batches=mass of first batch of doping element precursors: mass of second batch of doping element precursors: mass of third batch of doping element precursors.

TABLE 2

| No. | Chemical valence | ω (μg/cm³) | Σ (%) | E (%) | Initial exothermic temperature (° C.) | Integral area of exothermic peak (J/g) | Full width at half maximum (° C.) | Maximum exothermic temperature (° C.) |
|---|---|---|---|---|---|---|---|---|
| Ex. 1 | +5 | 25110 | 10 | 12 | 212 | 50 | 23 | 235 |
| Ex. 2 | +6 | 25480 | 9 | 10 | 208 | 74 | 25 | 233 |
| Ex. 3 | +4 | 25390 | 11 | 13 | 207 | 83 | 27 | 234 |
| Ex. 4 | +6 | 25210 | 10 | 9 | 213 | 42 | 19 | 232 |
| Ex. 5 | +8 | 25510 | 9 | 11 | 218 | 48 | 22 | 240 |
| Ex. 6 | +5 | 2290 | 10 | 9 | 201 | 77 | 30 | 231 |
| Ex. 7 | +5 | 14810 | 12 | 11 | 205 | 55 | 28 | 233 |
| Ex. 8 | +5 | 25220 | 9 | 10 | 211 | 52 | 23 | 234 |
| Ex. 9 | +5 | 36710 | 15 | 8 | 209 | 53 | 23 | 232 |
| Ex. 10 | +5 | 49090 | 9 | 12 | 208 | 85 | 26 | 234 |
| Ex. 11 | +8 | 25410 | 8 | 10 | 208 | 67 | 25 | 233 |
| Ex. 12 | +8 | 25280 | 20 | 11 | 201 | 95 | 28 | 229 |
| Ex. 13 | +4 | 25130 | 12 | 9 | 206 | 57 | 26 | 232 |
| Ex. 14 | +4 | 25310 | 13 | 10 | 209 | 52 | 25 | 234 |
| Ex. 15 | +3 | 25220 | 10 | 8 | 210 | 52 | 27 | 237 |
| Ex. 16 | +4 | 25290 | 9 | 11 | 212 | 47 | 25 | 237 |
| Ex. 17 | +6 | 25410 | 12 | 10 | 213 | 44 | 25 | 238 |
| Ex. 18 | +5 | 25000 | 11 | 29 | 205 | 72 | 29 | 230 |
| Ex. 19 | +5 | 25080 | 16 | 48 | 201 | 98 | 33 | 225 |
| CE. 1 | / | / | / | / | 185 | 136 | 35 | 220 |
| CE. 2 | +3 | 25090 | 9 | 10 | 196 | 113 | 30 | 226 |
| CE. 3 | +5 | 1510 | 8 | 9 | 197 | 105 | 31 | 228 |
| CE. 4 | +5 | 57990 | 9 | 11 | 199 | 113 | 33 | 232 |
| CE. 5 | +8 | 25510 | 33 | 9 | 194 | 123 | 32 | 226 |
| Ex. 20 | +5 | 25100 | 13 | 12 | 226 | 43 | 22 | 248 |

TABLE 2-continued

| No. | Chemical valence | ω (μg/cm³) | Σ (%) | E (%) | Initial exothermic temperature (° C.) | Integral area of exothermic peak (J/g) | Full width at half maximum (° C.) | Maximum exothermic temperature (° C.) |
|---|---|---|---|---|---|---|---|---|
| Ex. 21 | +8 | 24900 | 8 | 10 | 224 | 51 | 26 | 250 |
| CE. 6 | / | / | / | / | 205 | 112 | 34 | 239 |
| CE. 7 | +3 | 25300 | 10 | 12 | 208 | 105 | 31 | 239 |

The valence shown in Table 2 was the highest valence of the doping element in the "78% delithiated state" positive electrode active material.

TABLE 3

| No. | Initial gram capacity of button battery (mAh/g) | Initial gram capacity of full battery (mAh/g) | Capacity retention rate of full battery at 45° C., 1C/1C, 400 cycles (%) |
|---|---|---|---|
| Ex. 1 | 208.1 | 197.4 | 94.03 |
| Ex. 2 | 206.7 | 195.1 | 92.37 |
| Ex. 3 | 206.2 | 196.2 | 92.09 |
| Ex. 4 | 207.6 | 197.1 | 93.48 |
| Ex. 5 | 207.0 | 196.3 | 92.24 |
| Ex. 6 | 202.1 | 193.3 | 85.20 |
| Ex. 7 | 205.8 | 195.5 | 91.75 |
| Ex. 8 | 207.2 | 196.7 | 93.31 |
| Ex. 9 | 205.6 | 196.2 | 92.14 |
| Ex. 10 | 204.2 | 194.0 | 90.22 |
| Ex. 11 | 205.9 | 195.9 | 91.87 |
| Ex. 12 | 201.2 | 192.6 | 85.73 |
| Ex. 13 | 203.6 | 194.4 | 89.35 |
| Ex. 14 | 205.5 | 196.8 | 91.28 |
| Ex. 15 | 203.7 | 197.8 | 91.13 |
| Ex. 16 | 206.5 | 197.6 | 92.62 |
| Ex. 17 | 206.7 | 198.4 | 93.31 |
| Ex. 18 | 204.9 | 195.7 | 91.94 |
| Ex. 19 | 202.7 | 193.4 | 89.27 |
| CE. 1 | 196.9 | 186.5 | 80.74 |
| CE. 2 | 201.2 | 191.4 | 83.38 |
| CE. 3 | 201.4 | 190.7 | 84.22 |
| CE. 4 | 202.3 | 191.6 | 85.71 |
| CE. 5 | 198.6 | 191.7 | 84.76 |
| Ex. 20 | 184.6 | 180.4 | 95.53 |
| Ex. 21 | 183.7 | 179.3 | 94.81 |
| CE. 6 | 172.0 | 168.3 | 86.03 |
| CE. 7 | 179.5 | 174.2 | 88.22 |

From the comparison results of Examples 1 to 5, 13 to 17 and Comparative Examples 1 to 2, Examples 20 to 21 and Comparative Examples 6 to 7, it can be seen that by making the positive electrode active material comprise layered lithium nickel cobalt manganese oxide, the molar content of nickel in lithium nickel cobalt manganese oxide was from 60% to 90% of the total molar content of nickel, cobalt and manganese, and the transition metal layer comprised doping elements, and the relative deviation of the local mass concentration in the particles of the positive electrode active material was 20% or less, and the DSC plot of the positive electrode active material in the "78% delithiated state", the onset exothermic temperature of the main exothermic peak was 200° C. or more, and the integral area of the main exothermic peak was 100 J/g or less, resulting in that the lithium ion secondary battery had both higher capacity and higher high-temperature cycle performance.

From the results of Examples 6 to 10 and Comparative Examples 3 to 4, it can be seen that when the doping amount of the doping element was small, the doping element had insufficient binding capacity for oxygen atoms in the positive electrode material, and the structural stability of the positive electrode structure was still poor, resulting in that during the heating process of the material, the exothermic onset temperature and maximum exothermic temperature of DSC were both smaller, and the corresponding exothermic integral area and full width at half maximum were relatively large. The unstable structure of the positive electrode active material lead to the lower capacity and poor high-temperature cycle performance of the battery. When the doping amount was large, too much doping element destroyed the original structure of the positive electrode active material, resulting in poor thermal stability of the positive electrode active material. At the same time, the battery capacity and the cycle capacity retention rate at 45° C. were also lower.

From the results of Examples 11, 12 and Comparative Example 5, it can be seen that when the relative deviation of the local mass concentration of the doping element inside the positive electrode active material particles was 20% or less, the doping element was very uniformly distributed inside the positive electrode active material, and thus the stability improvement of the positive electrode active material was obvious, the thermal stability of the material was good, and the capacity and the high-temperature cycle performance of the corresponding battery were better; on the contrary, when the relative deviation of the local mass concentration of the doping element exceeded 20%, t the lattice stress in the uniform doping area as large, which deteriorated the capacity and high-temperature cycle performance of the battery.

It can be seen from the results of Examples 1, 18, and 19 that when c was less than 30%, it indicated that the doping element can be smoothly incorporated into the positive electrode active material particles, and the doping element can fully improve the structural stability of the positive electrode active material, which can improve the thermal stability of the positive electrode active material while improving the battery capacity and high-temperature cycle performance. When c was greater than 30%, more doping elements were distributed in the gap or surface of the positive electrode active material particles, the improvement effect of doping elements was not good, and the thermal stability of the positive electrode material was poor. However, the doping elements distributed on the surface provide certain effects of coating and isolating the side reaction of the electrolyte, so the cell capacity and high-temperature cycle performance were slightly reduced at this time.

The above mentioned descriptions only show particular implementations of the present application and but are not intended to limit the protection scope of the present application. Various equivalent modifications or replacements readily figured out by a person skilled in the art within the technical scope disclosed in the present application shall fall within the protection scope of the present application. Therefore, the protection scope of the present application shall be determined by the protection scope of the claims.

What is claimed is:

1. A method for preparing a positive electrode active material, comprising the following steps:
   mixing a positive electrode active material precursor, a lithium source and a doping element precursor to obtain a mixture, wherein the positive electrode active material precursor is selected from one or more of oxides, hydroxides and carbonates containing Ni, Co and Mn, and the molar content of nickel is from 60% to 90% of the total molar content of nickel, cobalt and manganese; and
   subjecting the mixture to sintering treatment to obtain the positive electrode active material;
   wherein the positive electrode active material comprises a lithium nickel cobalt manganese oxide, and the lithium nickel cobalt manganese oxide has a layered crystal structure of a space group R $\bar{3}$ m;
   a transition metal layer of the lithium nickel cobalt manganese oxide comprises a doping element, and the local mass concentration of the doping element in particles of the positive electrode active material has a relative deviation of 20% or less; and
   in a differential scanning calorimetry spectrum of the positive electrode active material in a 78% delithiation state, an initial exothermic temperature of a main exothermic peak is 200° C. or more, and an integral area of the main exothermic peak is 100 J/g or less.

2. The method according to claim 1, wherein the doping element precursor is selected from one or more of aluminum oxides, silicon oxides, titanium oxides, vanadium oxides, germanium oxides, selenium oxides, zirconium oxides, niobium oxides, ruthenium oxides, palladium oxides, antimony oxides, tellurium oxides, and tungsten oxides; and optionally, the doping element precursor is selected from one or more of $Al_2O_3$, $SiO_2$, $SiO$, $TiO_2$, $TiO$, $V_2O_5$, $V_2O_4$, $V_2O_3$, $GeO_2$, $SeO_2$, $ZrO_2$, $Nb_2O_5$, $NbO_2$, $RuO_2$, $PdO$, $Sb_2O_5$, $Sb_2O_3$, $TeO_2$, $WO_2$, and $WO_3$.

3. The method according to claim 1, wherein the sintering treatment satisfies at least one of the following (a)-(c):
   (a) the atmosphere of the sintering treatment is an oxygen-containing atmosphere; optionally, the oxygen concentration of the sintering atmosphere is from 70% to 100%, and optionally from 75% to 95%;
   (b) the temperature of the sintering treatment is from 600° C. to 1000° C., and optionally from 700° C. to 900° C.; and
   (c) the time of the sintering treatment is from 5 h to 25 h, and optionally from 10 h to 20 h.

4. The method according to claim 1, wherein the doping element precursor is equally divided into L parts or randomly divided into L parts and doped in L batches, wherein L is from 1 to 5, and optionally from 2 to 3;
   the method optionally comprises: mixing the positive electrode active material precursor, the lithium source, and a first batch of doping element precursor, and performing first sintering treatment; mixing the product of the first sintering treatment with a second batch of doping element precursor, and performing second sintering treatment; and so on until the product of the (L−1)-th sintering treatment is mixed with the L batch of doping element precursor; and performing L-th sintering treatment to obtain the positive electrode active material.

5. The method according to claim 4, wherein the method satisfies at least one of the following (a)-(c):
   (a) the temperature of each sintering treatment is from 600° C. to 1000° C., optionally from 700° C. to 900° C., and further optionally from 800° C. to 850° C.;
   (b) the time of each sintering treatment is from 3 h to 25 h, and optionally from 5 h to 10 h; and
   (c) the total sintering time is from 5 h to 25 h, and optionally from 15 h to 25 h.

* * * * *